(12) United States Patent
Huang et al.

(10) Patent No.: US 10,886,786 B2
(45) Date of Patent: Jan. 5, 2021

(54) MULTI-MODE WIRELESS POWER RECEIVER CONTROL

(71) Applicant: WiTricity Corporation, Watertown, MA (US)

(72) Inventors: Chang-Yu Huang, Auckland (NZ); Michael Le Gallais Kissin, Auckland (NZ); Jonathan Beaver, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 6 days.

(21) Appl. No.: 16/562,851

(22) Filed: Sep. 6, 2019

(65) Prior Publication Data

US 2019/0393728 A1 Dec. 26, 2019

Related U.S. Application Data

(62) Division of application No. 15/711,844, filed on Sep. 21, 2017, now Pat. No. 10,476,310.

(Continued)

(51) Int. Cl.
*H02J 7/00* (2006.01)
*H02J 7/14* (2006.01)
(Continued)

(52) U.S. Cl.
CPC .............. *H02J 50/12* (2016.02); *B60L 53/00* (2019.02); *B60L 53/122* (2019.02);
(Continued)

(58) Field of Classification Search
USPC ......................................................... 320/109
See application file for complete search history.

(56) References Cited

U.S. PATENT DOCUMENTS 9,384,885 B2 7/2016 Karalis et al.
10,476,310 B2 11/2019 Huang et al.
(Continued)

FOREIGN PATENT DOCUMENTS

WO 2014031773 2/2014
WO 2016186522 11/2016

OTHER PUBLICATIONS

"International Search Report and Written Opinion", PCT Application No. PCT/US2018/031857, 14 pages.

(Continued)

*Primary Examiner* — Alexis B Pacheco
(74) *Attorney, Agent, or Firm* — Colby Nipper PLLC

(57) ABSTRACT

In certain aspects, methods and systems for controlling power transfer at a wireless power receiver are disclosed. In certain aspects, a method includes determining a duty cycle of a DC-DC converter of the wireless power receiver. The method further includes determining a duty cycle limit for an AC switching controller based on the determined duty cycle. The method further includes determining an operational duty cycle for the AC switching controller. The method further includes comparing the operational duty cycle to the duty cycle limit. The method further includes adjusting at least one of a desired voltage and current input to the DC-DC converter when the operational duty cycle is greater than the duty cycle limit.

20 Claims, 14 Drawing Sheets

Related U.S. Application Data

(60) Provisional application No. 62/495,600, filed on May 26, 2017.

(51) Int. Cl.

| | | |
|---|---|---|
| *H02J 50/12* | (2016.01) | |
| *H04B 5/00* | (2006.01) | |
| *H02M 3/22* | (2006.01) | |
| *H02J 7/02* | (2016.01) | |
| *B60L 53/122* | (2019.01) | |
| *B60L 53/00* | (2019.01) | |
| *B60L 53/53* | (2019.01) | |
| *B60L 53/55* | (2019.01) | |
| *B60L 53/126* | (2019.01) | |
| *B60L 53/38* | (2019.01) | |
| *H02J 5/00* | (2016.01) | |
| *H02M 1/00* | (2006.01) | |
| *H02M 3/158* | (2006.01) | |

(52) U.S. Cl.
CPC ............. *B60L 53/126* (2019.02); *B60L 53/53* (2019.02); *B60L 53/55* (2019.02); *H02J 7/00* (2013.01); *H02J 7/025* (2013.01); *H02M 3/22* (2013.01); *H04B 5/0037* (2013.01); *B60L 53/38* (2019.02); *B60L 2210/10* (2013.01); *B60L 2210/12* (2013.01); *B60L 2210/14* (2013.01); *B60L 2210/30* (2013.01); *B60L 2240/527* (2013.01); *B60L 2240/529* (2013.01); *H02J 5/005* (2013.01); *H02J 7/007* (2013.01); *H02M 3/158* (2013.01); *H02M 2001/0074* (2013.01)

(56) References Cited

U.S. PATENT DOCUMENTS

| | | |
|---|---|---|
| 2011/0116290 A1 | 5/2011 | Boys |
| 2013/0207601 A1 | 8/2013 | Wu et al. |
| 2014/0042821 A1 | 2/2014 | Boys et al. |
| 2014/0203769 A1 | 7/2014 | Keeling et al. |
| 2015/0244176 A1* | 8/2015 | Van Den Brink ...... H02J 5/005 307/104 |
| 2015/0244341 A1 | 8/2015 | Ritter |
| 2016/0336808 A1 | 11/2016 | Liu et al. |
| 2016/0368387 A1 | 12/2016 | Pavlovsky et al. |
| 2018/0342897 A1 | 11/2018 | Huang et al. |

OTHER PUBLICATIONS

"Notice of Allowance", U.S. Appl. No. 15/711,844, dated Sep. 3, 2019, 9 Pages.

"Restriction Requirement", U.S. Appl. No. 15/711,844, dated May 8, 2019, 6 pages.

"International Preliminary Report on Patentability", PCT Application No. PCT/US2018/031857, dated Dec. 5, 2019, 11 pages.

* cited by examiner

: Rising edge of signal applied to gate (S1 and S2 for their respective waveform) can happen anytime within this labelled duration. While the signal is applied to the gate within this duration, the respective switch performs active rectification instead of the diode.

Step $t_0 - t_1$

Step $t_1 - t_2$

Step $t_2 - t_3$

1200 ⟶

```
                                                         ┌─1202
┌─────────────────────────────────────────────────────────┐
│                                                         │
│   Adjust a duty cycle of a DC-DC converter and a duty   │
│  cycle of an AC switching controller to control a voltage│
│    and a current through the wireless power receiver    │
│                                                         │
└─────────────────────────────────────────────────────────┘
```

*FIG. 12*

MULTI-MODE WIRELESS POWER RECEIVER CONTROL

CROSS-REFERENCE TO RELATED APPLICATIONS

This application is a divisional of and claims the benefit of U.S. Utility application Ser. No. 15/711,844, filed Sep. 21, 2017 which in turn claims priority to U.S. Provisional Patent No. 62/495,600, filed May 26, 2017 the content of these applications are hereby incorporated by reference in their entireties.

FIELD

This application is generally related to wireless charging power transfer applications, and specifically to a method and apparatus for power control at a wireless power receiver using both an AC switching control and a DC-DC converter.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless power charging systems that are capable of transferring power in free space (e.g., via a wireless field) to be used to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device (e.g., a base pad, base wireless charging system, or some other wireless power transfer device including a power transfer element (e.g., base power transfer element)) transmits power to a secondary (or "pick-up") power receiver device (e.g., a vehicle pad, an electric vehicle wireless charging unit, or some other wireless power receiving device including a power transfer element (e.g., vehicle power transfer element)). Each of the transmitter and receiver power devices includes inductors, typically coils or windings of electric current conveying media. An alternating current in the primary inductor produces a fluctuating magnetic field. When the secondary inductor is placed in proximity to the primary inductor, the fluctuating magnetic field induces an electromotive force (EMF) in the secondary inductor, thereby transferring power to the secondary power receiver device.

SUMMARY

In certain aspects, a method for controlling power transfer at a wireless power receiver is disclosed. The method includes determining a duty cycle of a DC-DC converter of the wireless power receiver based on one of a voltage and a current output to a load of the wireless power receiver and one of a desired voltage and current input to the DC-DC converter. The method includes determining a duty cycle limit for an AC switching controller based on the determined duty cycle and the one of the voltage and the current output to the load. The method includes determining an operational cycle for the AC switching controller based on the other one of the desired voltage and current input to the DC-DC converter and an actual one of a current and voltage output from the AC switching controller. The method includes comparing the operational duty cycle to the duty cycle limit. The method includes adjusting at least one of the desired voltage and current input to the DC-DC converter when the operational duty cycle is greater than the duty cycle limit.

In certain aspects, a method for controlling power transfer at a wireless power receiver is disclosed. The method includes wirelessly coupling power at a power transfer element of the wireless power receiver via a wireless field to generate a voltage and current through the wireless power receiver. The method includes adjusting a duty cycle of a DC-DC converter and a duty cycle of an AC switching controller to control the voltage and the current through the wireless power receiver.

In certain aspects, a wireless power receiver is disclosed. The wireless power receiver includes a DC-DC converter, an AC switching controller, and a resonant circuit configured to couple to a wireless power field, wherein an input of the AC switching controller is coupled to an output of the resonant circuit, and wherein an output of the AC switching controller is coupled to an input of the DC-DC converter.

In certain aspects, a wireless power receiver is disclosed. The wireless power receiver includes means for determining a duty cycle of a DC-DC converter of the wireless power receiver based on one of a voltage and a current output to a load of the wireless power receiver and one of a desired voltage and current input to the DC-DC converter. The wireless power receiver includes means for determining a duty cycle limit for an AC switching controller based on the determined duty cycle and the one of the voltage and the current output to the load. The wireless power receiver includes means for determining an operational duty cycle for the AC switching controller based on the other one of the desired voltage and current input to the DC-DC converter and an actual one of a current and voltage output from the AC switching controller. The wireless power receiver includes means for comparing the operational duty cycle to the duty cycle limit. The wireless power receiver includes means for adjusting at least one of the desired voltage and current input to the DC-DC converter when the operational duty cycle is greater than the duty cycle limit.

BRIEF DESCRIPTION OF THE DRAWINGS

FIG. 12 is a flowchart illustrating example operations for controlling power at a wireless power receiver.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
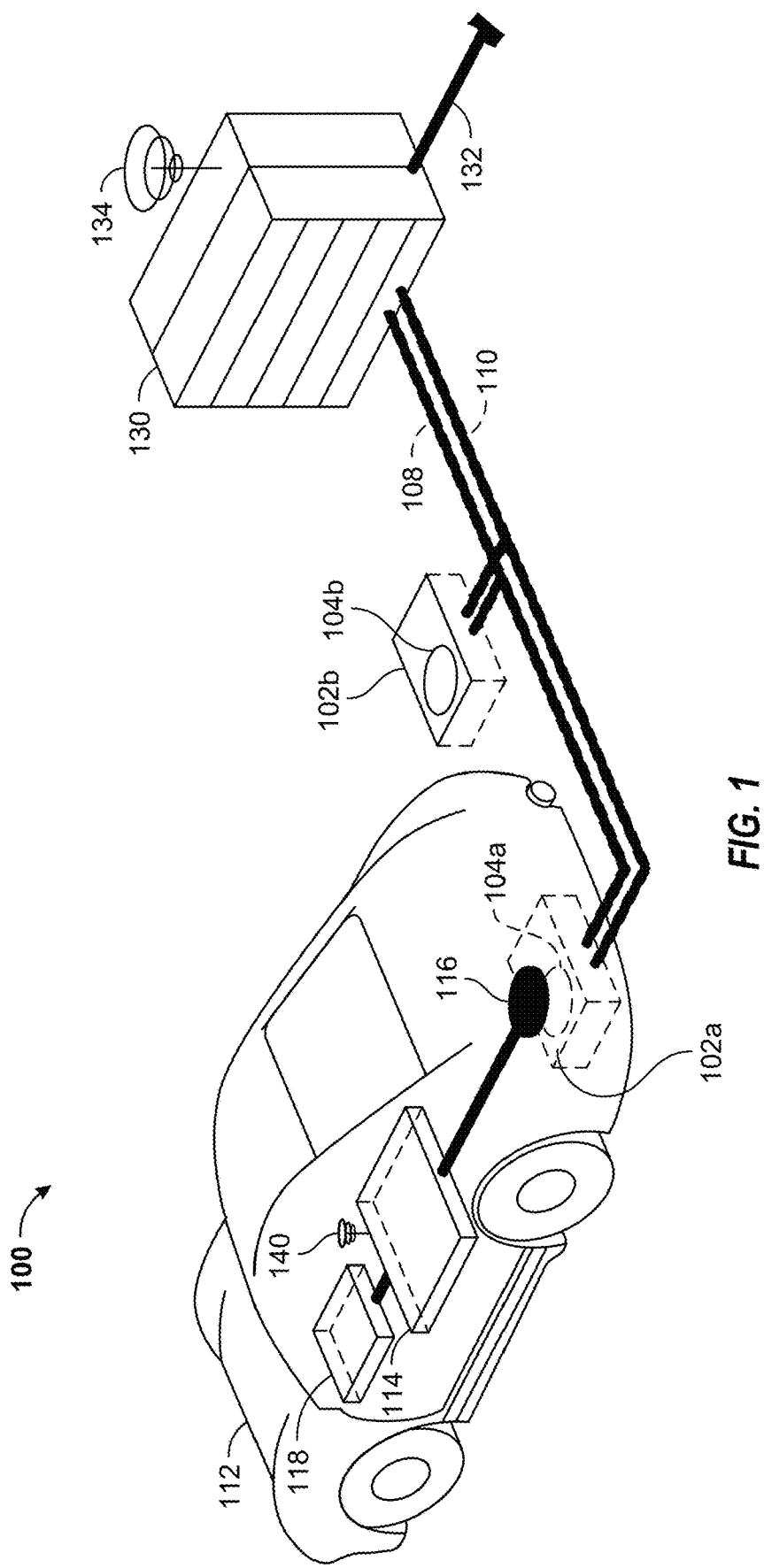
FIG. 1 illustrates a wireless power transfer system for charging an electric vehicle, in accordance with some implementations.

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base power transfer element 104a and 104b, respectively, for wirelessly transferring power. In some other implementations (not shown in FIG. 1), base power transfer elements 104a or 104b may be stand-alone physical units and are not part of the base wireless charging system 102a or 102b.

The electric vehicle 112 may include a battery unit 118, an electric vehicle power transfer element 116, and an electric vehicle wireless charging unit 114. The electric vehicle wireless charging unit 114 and the electric vehicle power transfer element 116 constitute the electric vehicle wireless charging system. In some diagrams shown herein, the electric vehicle wireless charging unit 114 is also referred to as the vehicle charging unit (VCU). The electric vehicle power transfer element 116 may interact with the base power transfer element 104a for example, via a region of the electromagnetic field generated by the base power transfer element 104a.

In some exemplary implementations, the electric vehicle power transfer element 116 may receive power when the electric vehicle power transfer element 116 is located in an electromagnetic field produced by the base power transfer element 104a. The field may correspond to a region where energy output by the base power transfer element 104a may be captured by the electric vehicle power transfer element 116. For example, the energy output by the base power transfer element 104a may be at a level sufficient to charge or power the electric vehicle 112. In some cases, the field may correspond to a "near-field" of the base power transfer element 104a. The near-field may correspond to a region in which there are strong reactive fields resulting from the currents and charges in the base power transfer element 104a that do not radiate power away from the base power transfer element 104a. In some cases the near-field may correspond to a region that is within about $\frac{1}{2}\pi$ of a wavelength of the a frequency of the electromagnetic field produced by the base power transfer element 104a distant from the base power transfer element 104a, as will be further described below.

The electric vehicle power transfer element 116 and base power transfer element 104 as described throughout the disclosed implementations may be referred to or configured as "loop" antennas, and more specifically, multi-turn loop antennas. The elements 104 and 116 may also be referred to herein or be configured as "magnetic" antennas. The term "power transfer element" is intended to refer to a component that may wirelessly output or receive energy for coupling to another "power transfer element." The power transfer element may also be referred to as an "antenna" or a "coupler" of a type that is configured to wirelessly output or receive power. As used herein, power transfer elements 104 and 116 are examples of "power transfer components" of a type that are configured to wirelessly output, wirelessly receive, and/ or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

Local distribution center 130 may be configured to communicate with external sources (e.g., a power grid) via a communication backhaul 134, and with the base wireless charging system 102a via a communication link 108.

In some implementations the electric vehicle power transfer element 116 may be aligned with the base power transfer element 104a and, therefore, disposed within a near-field region simply by the electric vehicle operator positioning the electric vehicle 112 such that the electric vehicle power transfer element 116 is sufficiently aligned relative to the base power transfer element 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the power transfer elements 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
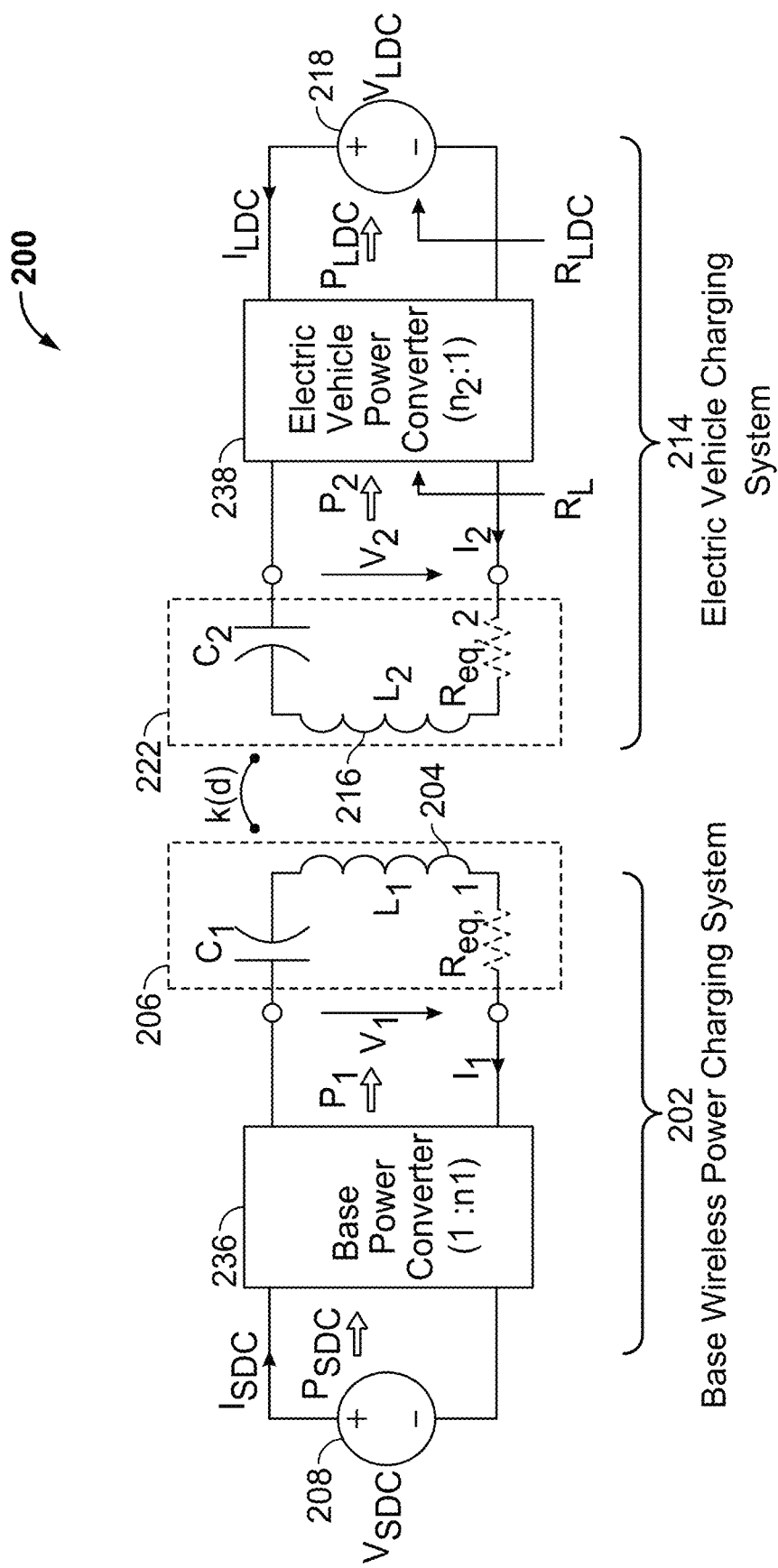
FIG. 2 is a schematic diagram of exemplary components of the wireless power transfer system of FIG. 1.

FIG. 2 is a schematic diagram of exemplary components of a wireless power transfer system 200 similar to that previously discussed in connection with FIG. 1, in accordance with some exemplary implementations. The wireless power transfer system 200 may include a base resonant circuit 206 including a base power transfer element 204 having an inductance L1. The wireless power transfer system 200 further includes an electric vehicle resonant circuit 222 including an electric vehicle power transfer element 216 having an inductance L2. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power transfer element 216 and the base power transfer element 204. Using resonant structures for coupling energy may be referred to as "magnetically coupled resonance," "electromagnetically coupled resonance," and/or "resonant induction." The operation of the wireless power transfer system 200 will be described based on power transfer from a base power transfer element 204 to an electric vehicle 112 (not shown), but is not limited thereto. For example, as discussed above, energy may be also transferred in the reverse direction.

With reference to FIG. 2, a power supply 208 (e.g., AC or DC) supplies power PSDC to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power P1 to the base resonant circuit 206 including tuning capacitor C1 in series with base power transfer element 204 to emit an electromagnetic field at the operating frequency. The series-tuned resonant circuit 206 should be construed as exemplary. In another implementation, the capacitor C1 may be coupled with the base power transfer element 204 in parallel. In yet other implementations, tuning may be formed of several reactive elements in any combination of parallel or series topology. The capacitor C1 may be provided to form a resonant circuit with the base power transfer element 204 that resonates substantially at the operating frequency. The base power transfer element 204 receives the power P1 and wirelessly transmits power at a level sufficient to charge or power the electric vehicle. For example, the level of power provided wirelessly by the base power transfer element 204 may be on the order of kilowatts (kW) (e.g., anywhere from 1 kW to 110 kW, although actual levels may be or higher or lower).

The base resonant circuit 206 (including the base power transfer element 204 and tuning capacitor C1) and the electric vehicle resonant circuit 222 (including the electric vehicle power transfer element 216 and tuning capacitor C2) may be tuned to substantially the same frequency. The electric vehicle power transfer element 216 may be positioned within the near-field of the base power transfer element and vice versa, as further explained below. In this case, the base power transfer element 204 and the electric vehicle power transfer element 216 may become coupled to one another such that power may be transferred wirelessly from the base power transfer element 204 to the electric vehicle power transfer element 216. The series capacitor C2 may be provided to form a resonant circuit with the electric vehicle power transfer element 216 that resonates substantially at the operating frequency. The series-tuned resonant circuit 222 should be construed as being exemplary. In another implementation, the capacitor C2 may be coupled with the electric vehicle power transfer element 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances Req,1 and Req,2 represent the losses that may be inherent to the base and electric vehicle power transfer elements 204 and 216 and the tuning (anti-reactance) capacitors C1 and C2, respectively. The electric vehicle resonant circuit 222, including the electric vehicle power transfer element 216 and capacitor C2, receives and provides the power P2 to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power PLDC to the load 218. The power supply 208, base power converter 236, and base power transfer element 204 may be stationary and located at a variety of locations as discussed above. The electric vehicle load 218 (e.g., the electric vehicle battery unit), electric vehicle power converter 238, and electric vehicle power transfer element 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle power transfer element 216 to the base wireless power charging system 202 to feed power back to the grid. Each of the electric vehicle power transfer element 216 and the base power transfer element 204 may act as transmit or receive power transfer elements based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle power transfer element 216 to the electric vehicle power converter 238. Disconnecting the electric vehicle power transfer element 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base power transfer element 204 as further explained below.

As described above, in operation, during energy transfer towards an electric vehicle (e.g., electric vehicle 112 of FIG. 1), input power is provided from the power supply 208 such that the base power transfer element 204 generates an electromagnetic field for providing the energy transfer. The electric vehicle power transfer element 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle power transfer element 216 is located in the near-field coupling mode region of the base power transfer element 204 as further explained below.

As stated, an efficient energy transfer occurs by transferring energy via a magnetic near-field rather than via electromagnetic waves in the far field, which may involve substantial losses due to radiation into the space. When in the near-field, a coupling mode may be established between the transmit power transfer element and the receive power transfer element. The space around the power transfer elements where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle power transfer element 216 and base power transfer element 204 as described throughout the disclosed implementations may be referred to or configured as "conductor loops", and more specifically, "multi-turn conductor loops" or coils. The base and electric vehicle power transfer elements 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a power transfer element (e.g., the base power transfer element 204 and capacitor C2) as described above. As shown in FIG. 2, inductance may generally be the inductance of the power transfer element, whereas, capacitance may be added to the power transfer element to create a resonant structure at a desired resonant frequency. Accordingly, for larger size power transfer elements using larger diameter coils exhibiting larger inductance, the value of capacitance needed to produce resonance may be lower. Inductance may also depend on a number of turns of a coil. Furthermore, as the size of the power transfer element increases, coupling efficiency may increase. This is mainly true if the size of both base and electric vehicle power transfer elements increase. Furthermore a resonant circuit including a power transfer element and tuning capacitor may be designed to have a high quality (Q) factor to improve energy transfer efficiency. For example, the Q factor may be 300 or greater.

As described above, according to some implementations, coupling power between two power transfer elements that are in the near-field of one another is disclosed. As described above, the near-field may correspond to a region around the power transfer element in which mainly reactive electromagnetic fields exist. If the physical size of the power transfer element is much smaller than the wavelength, inversely proportional to the frequency, there is no substantial loss of power due to waves propagating or radiating away from the power transfer element. Near-field coupling-mode regions may correspond to a volume that is near the physical volume of the power transfer element, typically within a small fraction of the wavelength. According to some implementations, magnetic power transfer elements, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power transfer elements (e.g., dipoles and monopoles) or a combination of magnetic and electric power transfer elements may be used.

Figure 3:
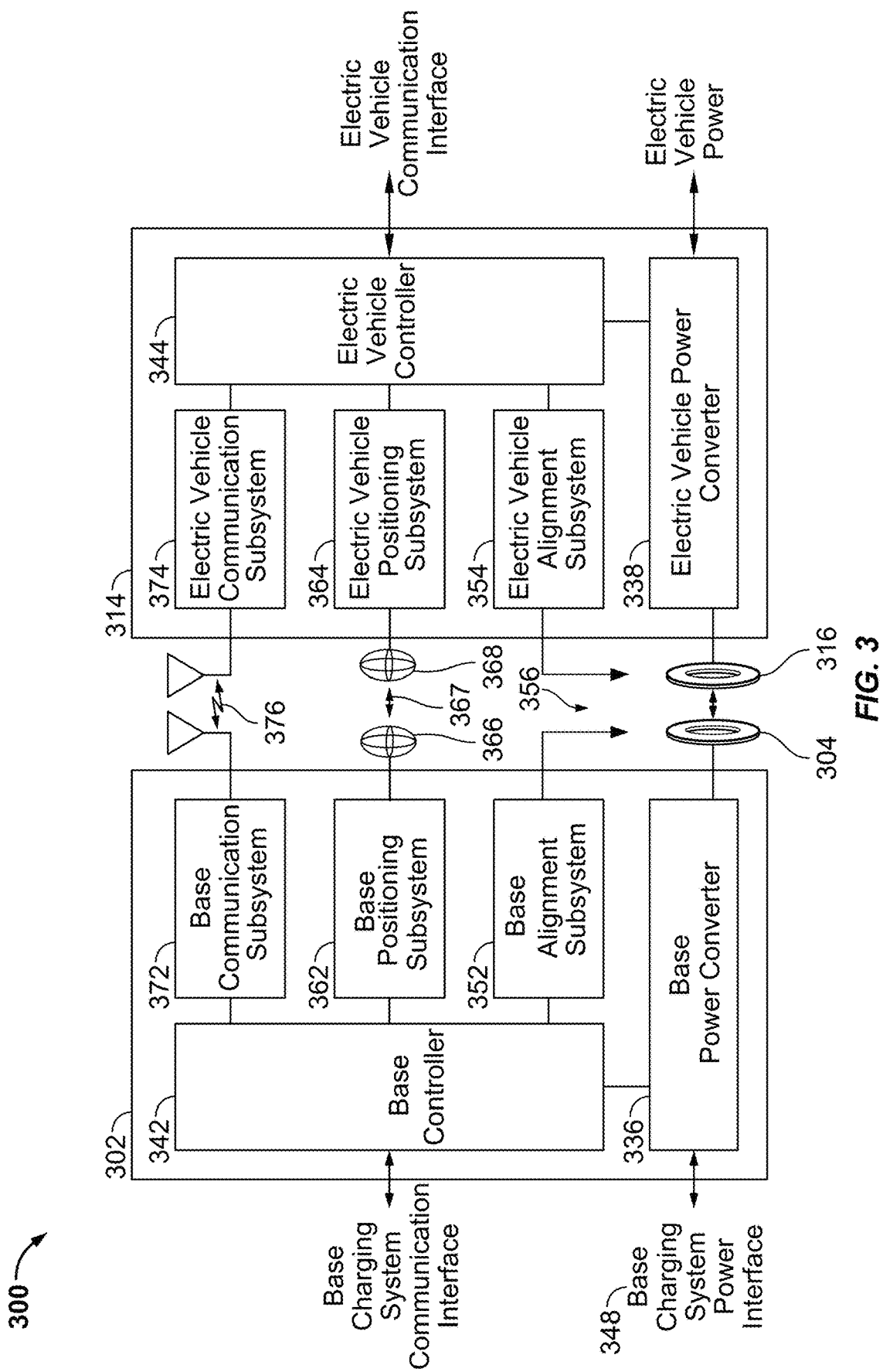
FIG. 3 is a functional block diagram showing exemplary components of the wireless power transfer system of FIG. 1.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a positioning link 367, using, for example, a magnetic field signal for determining a position or direction, and an alignment mechanism 356 capable of mechanically moving one or both of the base power transfer element 304 and the electric vehicle power transfer element 316. Mechanical (kinematic) alignment of the base power transfer element 304 and the electric vehicle power transfer element 316 may be controlled by the base alignment subsystem 352 and the electric vehicle charging alignment subsystem 354, respectively. The positioning link 367 may be capable of bi-directional signaling, meaning that positioning signals may be emitted by the base positioning subsystem or the electric vehicle positioning subsystem or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base power transfer element 304 at a frequency near or at the resonant frequency of the base resonant circuit 206 with reference to FIG. 2. The electric vehicle power transfer element 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle power transfer element 316 to a power signal suitable for charging a battery via the electric vehicle power interface.

The base wireless charging system 302 includes a base controller 342 and the electric vehicle wireless charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication subsystem 372 and electric vehicle communication subsystem 374 may include subsystems or circuits for specific application with separate communication channels and also for wirelessly communicating with other communications entities not shown in the diagram of FIG. 3. These communications channels may be separate physical channels or separate logical channels. As non-limiting examples, a base alignment subsystem 352 may communicate with an electric vehicle alignment subsystem 354 through communication link 376 to provide a feedback mechanism for more closely aligning the base power transfer element 304 and the electric vehicle power transfer element 316, for example via autonomous mechanical (kinematic) alignment, by either the electric vehicle alignment subsystem 354 or the base alignment subsystem 352, or by both, or with operator assistance.

The electric vehicle wireless charging system 314 may further include an electric vehicle positioning subsystem 364 connected to a magnetic field generator 368. The electric vehicle positioning subsystem 364 may be configured to drive the magnetic field generator 368 with currents that generate an alternating magnetic field. The base wireless charging system 302 may include a magnetic field sensor 366 connected to a base positioning subsystem 362. The magnetic field sensor 366 may be configured to generate a plurality of voltage signals under influence of the alternating magnetic field generated by the magnetic field generator 368. The base positioning subsystem 362 may be configured to receive these voltage signals and output a signal indicative of a position estimate and an angle estimate between the magnetic field sensor 366 and the magnetic field sensor 368. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power transfer elements 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may also support plug-in charging via a wired connection, for example, by providing a wired charge port (not shown) at the electric vehicle wireless charging system 314. The electric vehicle wireless charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle wireless charging system 314, the wireless power transfer system 300 may use in-band signaling via base and electric vehicle power transfer elements 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power transfer elements 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base power transfer element 304. By way of example, a load sensing circuit monitors the current flowing to a power amplifier of the base power converter 336, which is affected by the presence or absence of active power receivers in the near-field coupling mode region of the base power transfer element 304. Detection of changes to the loading on the power amplifier may be monitored by the base controller 342 for use in determining whether to enable the base wireless charging system 302 for transmitting energy, to communicate with a receiver, or a combination thereof.

In certain aspects, the amount of power transferred between the wireless power transmitter (e.g., a base pad, base wireless charging system 102, 202, 302, etc., or some other wireless power transfer device including a power transfer element (e.g., base power transfer element 104, 204, 304, etc.)) and the wireless power receiver (e.g., a vehicle pad, an electric vehicle wireless charging unit 114, 214, 314, etc., or some other wireless power receiving device including a power transfer element (e.g., vehicle power transfer element 116, 216, 316, etc.)) may vary based on a number of variables, including changes in magnetic coupling between the wireless power transmitter and the wireless power receiver, and variation in a load (e.g., battery voltage in a battery charged by the wireless power receiver) at the wireless power receiver. In certain aspects, control schemes are implemented at both the wireless power receiver and the wireless power transmitter to compensate for these variables and have a substantially constant power transfer between the wireless power receiver and the wireless power transmitter. In certain aspects, such as in implementations of wireless electric vehicle charging (WEVC) systems, the primary power control is performed by the wireless power transmitter (e.g., stationary vehicle charger, base controller 342, etc.), and secondary power control is performed by the wireless power receiver (e.g., vehicle side (e.g., by a vehicle control unit (VCU), electric vehicle controller 344, etc.)). The secondary power control, in certain aspects, may utilize one of two controller topologies, a DC-DC converter topology, or a synchronous AC switching topology as described below with respect to FIGS. 4 and 4A.

Figure 4:
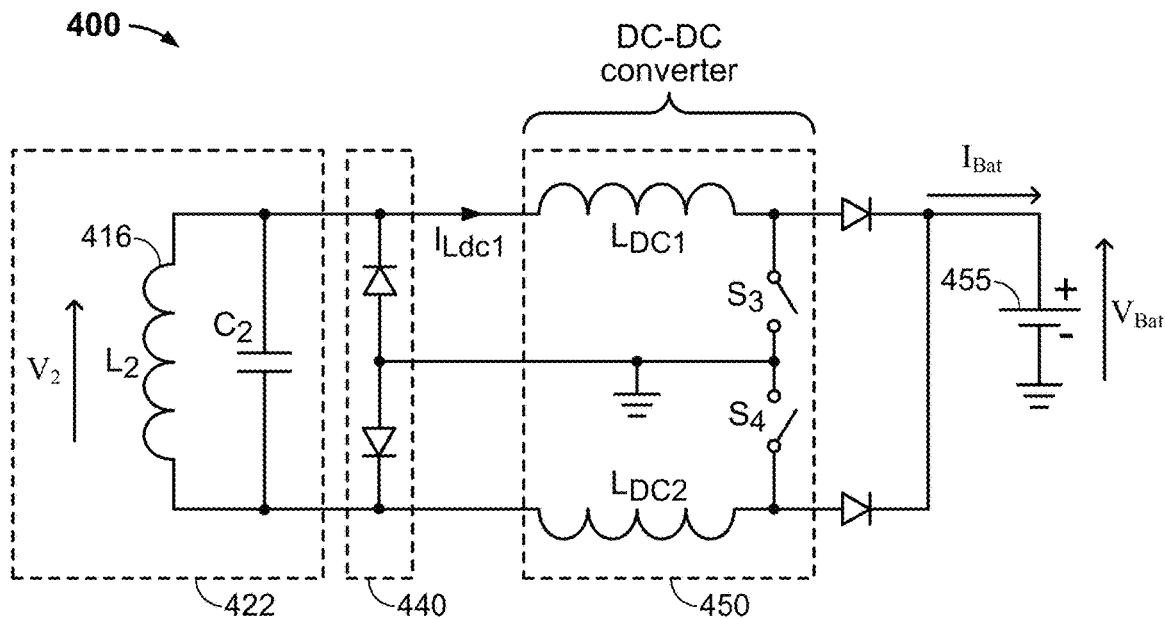
FIG. 4 is a schematic diagram of exemplary components of a wireless power receiver configured to perform power control.

FIG. 4 is a schematic diagram of exemplary components of a wireless power receiver 400 configured to perform power control. Wireless power receiver 400 may be an example implementation of a vehicle pad, an electric vehicle wireless charging unit 114, 214, 314, etc., or some other wireless power receiving device including a power transfer element (e.g., vehicle power transfer element 116, 216, 316, etc.). As shown, wireless power receiver 400 includes a vehicle power transfer element 416 having an inductance $L_2$. The wireless power receiver 400 further includes an electric vehicle resonant circuit 422 (including the electric vehicle power transfer element 416 and tuning capacitor C2), for tuning a resonant frequency of the wireless power receiver 400. The wireless power receiver 400 further includes a rectifier 440 comprising diodes configured to convert an AC signal generated at the resonant circuit 422 to a DC signal. In certain aspects, instead of rectifier 440 comprising diodes, rectifier 440 may comprise one or more switches, such as a synchronous rectifier.

The DC signal output from the rectifier 440 is received at a DC-DC converter 450 (e.g., boost converter, buck converter, etc.) of the wireless power receiver 400. The DC-DC converter 450 is configured to control a voltage output to a load 455. The DC-DC converter 450 includes an inductor $L_{DC1}$ having an inductance $L_{DC1}$ and an inductor $L_{DC2}$ having an inductance $L_{DC2}$ each coupled to the output of the rectifier 440 as shown. The inductors $L_{DC1}$ and $L_{DC2}$ are in parallel to each other. The DC-DC converter 450 further includes switches $S_3$ and $S_4$ configured to selectively couple the output of the inductors $L_{DC1}$ and $L_{DC2}$ respectively to ground. The output of the inductors $L_{DC1}$ and $L_{DC2}$ are further coupled via respective diodes to the load 455 (e.g., battery).

In some aspects, when the switch $S_3$ is closed, the output of the inductor $L_{DC1}$ is shorted to ground and therefore there is reduced output voltage to the load 455. In some aspects, when the switch $S_3$ is open, the full output voltage of the inductor $L_{DC1}$ is output to the load 455. Accordingly, in some aspects, selectively opening and closing $S_3$ controls the average voltage output to the load 455. Similarly, in some aspects, when the switch $S_4$ is closed, the output of the inductor $L_{DC2}$ is shorted to ground and therefore there is reduced output voltage to the load 455. In some aspects, when the switch $S_4$ is open, the full output voltage of the inductor $L_{DC2}$ is output to the load 455. Accordingly, in some aspects, selectively opening and closing $S_4$ controls the average voltage output to the load 455. In some aspects, such as in a battery charging application, where the output of the DC-DC converter 450 is coupled to a voltage source load (e.g., a battery), selectively opening and closing switches $S_3$ and $S_4$ controls the average output voltage seen by the DC-DC converter 450 and consequently the rectifier 440 and the electric vehicle resonant circuit 422. In some aspects, the opening and closing of switches $S_3$ and $S_4$ are controlled to open and close at substantially the same time and/or with substantially the same duty cycle. In some aspects, the opening and closing of switches $S_3$ and $S_4$ are controlled to open and close at different times and/or with different duty cycles (e.g., period of cycling one or more switches between an open state and a closed state). In some aspects, opening and closing of switches $S_3$ and $S_4$ is controlled by a controller, processor, integrated circuit, circuit, etc., such as electric vehicle controller 344.

In certain aspects, a DC-DC power converter, such as DC-DC power converter 450 can effectively control output voltage based on input voltage (e.g., voltage induced at resonant circuit 422). However, large current can be induced at a wireless power receiver (e.g., if primary power control is ineffective or not performed by a wireless power transmitter). Accordingly, in certain aspects, the components of the DC-DC converter (e.g., switches, inductors, etc.) may be designed to be rated for the full output current from the wireless power receiver (e.g., the full resonant tank output current proportional to the coupling and current from the wireless power transmitter). This may require large overhead on the components, such as requiring larger and/or costlier components.

Figure 4A:
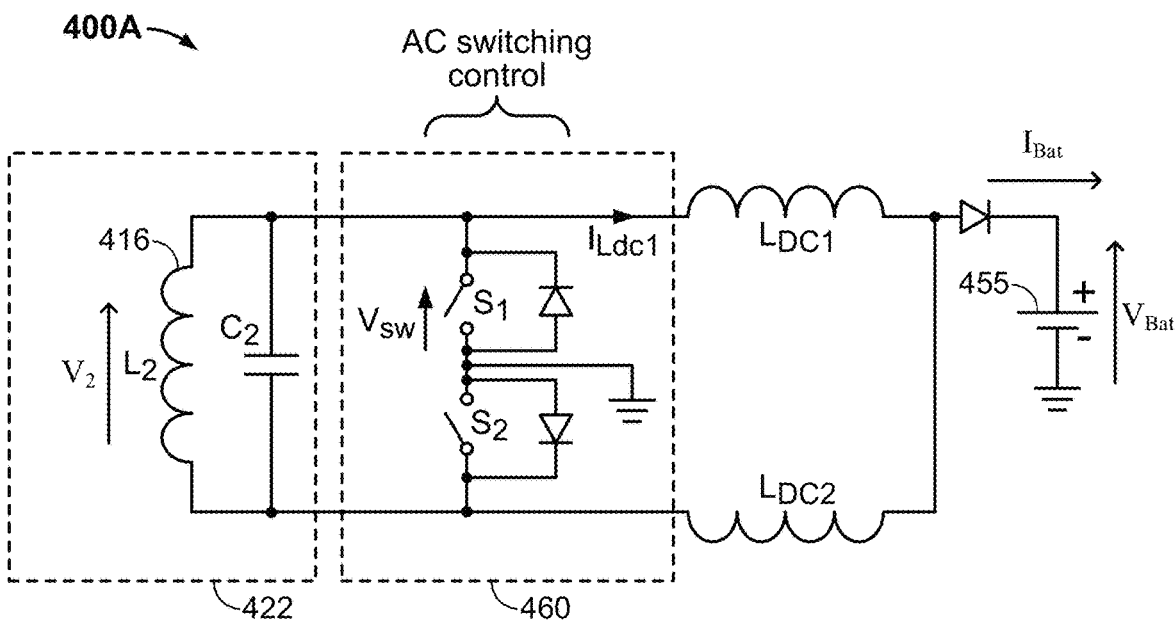
FIG. 4A is a schematic diagram of exemplary components of a wireless power receiver configured to perform power control.

FIG. 4A is a schematic diagram of exemplary components of a wireless power receiver 400A configured to perform power control. Wireless power receiver 400A may be an example implementation of a vehicle pad, an electric vehicle wireless charging unit 114, 214, 314, etc., or some other wireless power receiving device including a power transfer element (e.g., vehicle power transfer element 116, 216, 316, etc.). As shown, wireless power receiver 400A is similar to wireless power receiver 400 and includes a vehicle power transfer element 416 having an inductance $L_2$. The wireless power receiver 400A further includes an electric vehicle resonant circuit 422 (including the electric vehicle power transfer element 416 and tuning capacitor C2), for tuning a resonant frequency of the wireless power receiver 400A.

The wireless power receiver 400A further includes an (e.g., synchronous) AC switching control circuit 460. The AC switching control circuit 460 is configured to control a current output to the load 455. The AC switching control circuit 460 includes switches $S_1$ and $S_2$ configured to selectively clamp or short the AC signal output from the resonant circuit 422 to ground. The diodes shown in parallel to switches $S_1$ and $S_2$ may, in certain aspects, correspond to the body diodes of the switches themselves, which may act as a rectifier (e.g., similar to rectifier 440). In some aspects, the diodes may be separate diodes to act as a rectifier.

The output of the AC switching control circuit 460 is further coupled to inductors $L_{DC1}$ and $L_{DC2}$. The inductors $L_{DC1}$ and $L_{DC2}$ are in parallel to each other. The output of the inductors $L_{DC1}$ and $L_{DC2}$ are further coupled via a diode to the load 455 (e.g., battery).

When the switches $S_1$ and $S_2$ are closed, the AC signal output of the resonant circuit 422 is shorted to ground and therefore there is reduced current to the inductors $L_{DC1}$ and $L_{DC2}$ and therefore the load 455. When the switches $S_1$ and $S_2$ are open, the output current of the resonant circuit 422 is output to the inductors $L_{DC1}$ and $L_{DC2}$ and therefore the load 455. Accordingly selectively opening and closing switches $S_1$ and $S_2$ controls the average current output to the load 455. In some aspects, the opening and closing of switches $S_1$ and $S_2$ are controlled to open and close synchronously such as at substantially the same time relative to their individual half cycle waveform, and with substantially the same duty cycle. For example, in some aspects, switches $S_1$ and $S_2$ are opened and closed relative to their individual half cycle waveform as shown in FIG. 4B.

Figure 4B:
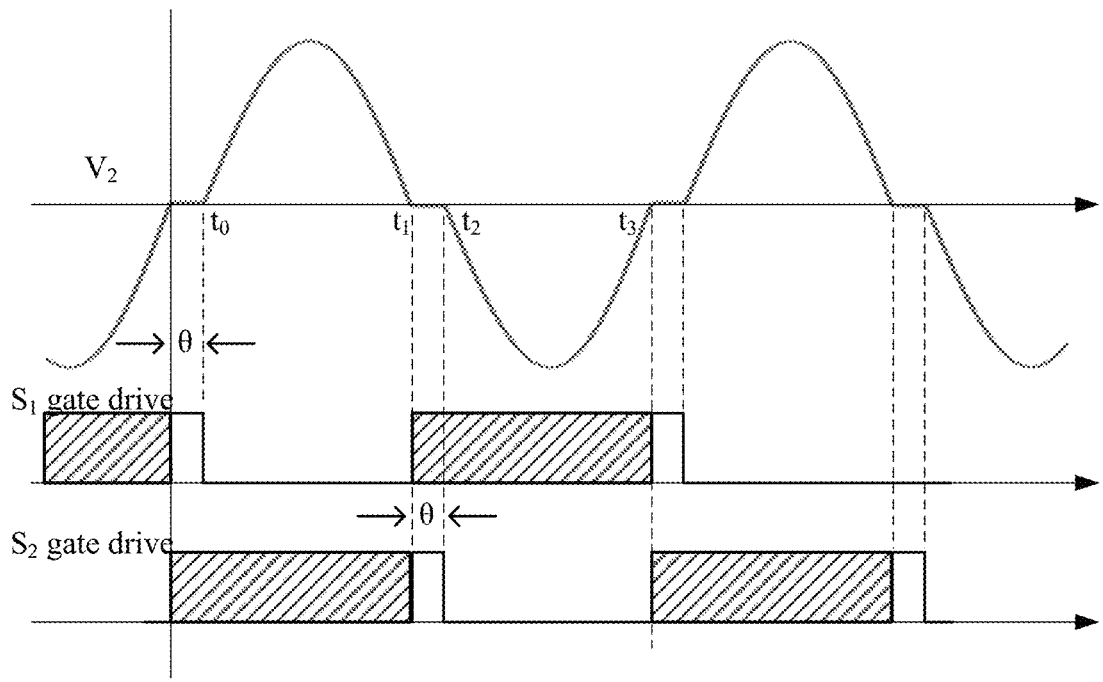
FIG. 4B illustrates a graph of example signals for opening and closing switches corresponding to the exemplary components of a wireless power receiver configured to perform power control of FIG. 4A.
Figure 4B:
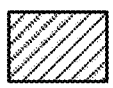

For example, the top x-axis of FIG. 4B represents the voltage $V_2$ of a signal across the vehicle power transfer element 416 of FIG. 4A. As shown, signals (e.g., to close) are applied separately to the gate drives of each of the switches $S_1$ and $S_2$ at the different half cycles of the signal $V_2$, respectively. In some aspects, opening and closing of switches $S_1$ and $S_2$ is controlled by a controller, processor, integrated circuit, circuit, etc., such as electric vehicle controller 344. In particular, the middle x-axis represents a signal applied to a gate of switch $S_1$ to selectively open and close switch $S_1$. The bottom x-axis represents a signal applied to a gate of switch $S_2$ to selectively open and close switch $S_2$. In this example, when no signal is applied (shown as no value above the corresponding x-axis) to a gate of a switch (e.g., as shown prior to 0, between $t_2$ and $t_3$ and at the end of the graph for $S_2$ and as shown between to and $t_1$ and at the end of the graph for $S_1$) the switch is open. When a signal is applied (shown as a value without hatching above the corresponding x-axis) to a gate of a switch (e.g., as shown between $t_1$ and $t_2$ for $S_2$ and as shown between 0 and to for $S_1$) the switch is closed. Further, as stated in the graph, for values shown with hatching above the corresponding x-axis (e.g., prior to 0 and between $t_1$ and $t_3$ for $S_1$ and between 0 and $t_1$ for $S_2$) the rising edge of the signal applied to the gate of the switch for closing the switch may occur anytime during that time period. Accordingly, while a signal is applied to the gate of a switch (e.g., the gate is high) during that time period the respective switch performs active rectification instead of a corresponding diode (e.g., body diode of the switch or a separate diode).

Figure 5:
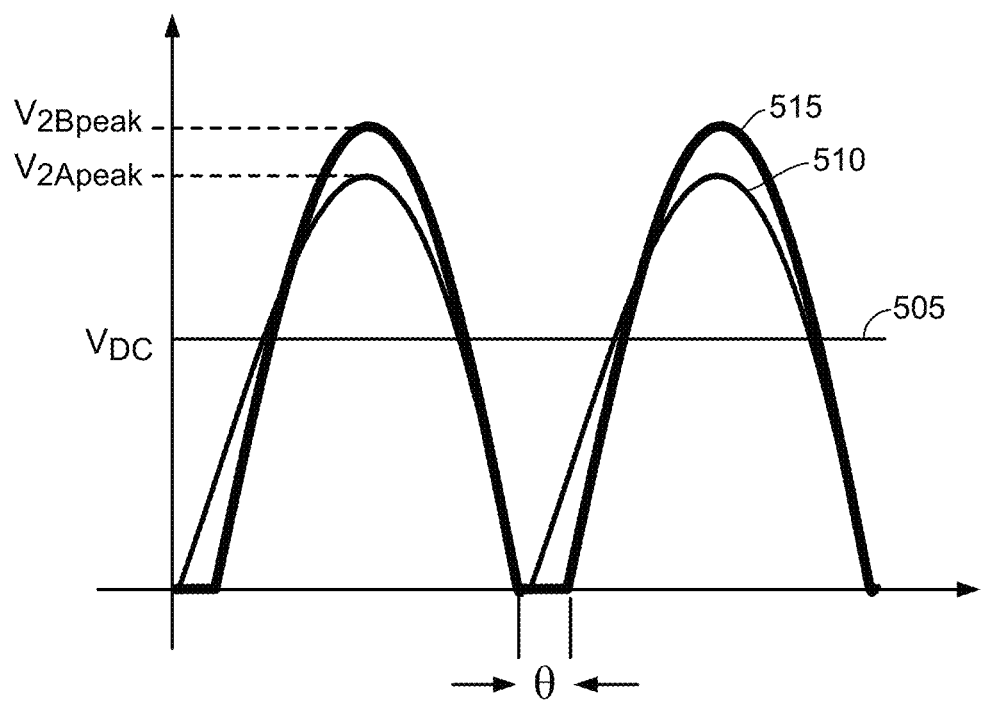
FIG. 5 illustrates a graph of an example voltage across an AC switching control circuit for different clamping angles.
Figure 6:
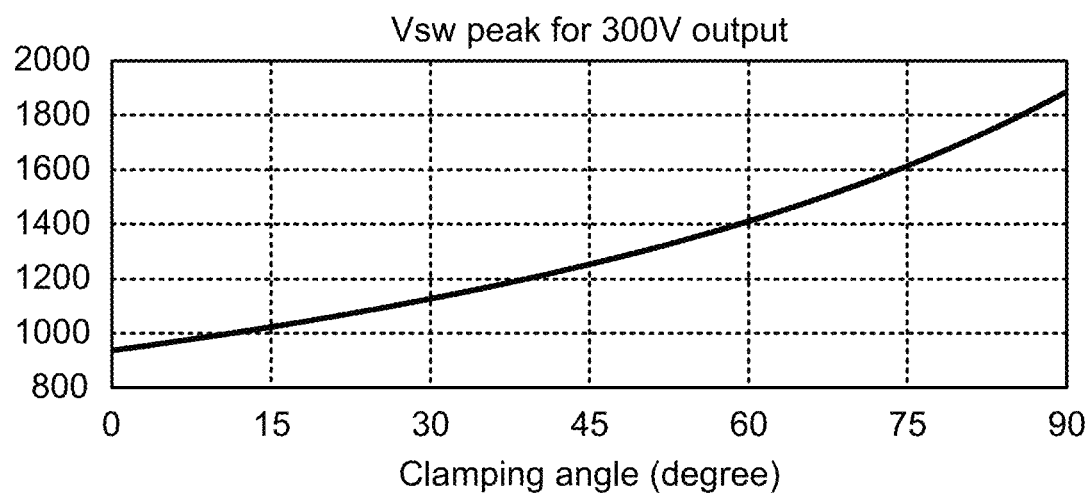
FIG. 6 illustrates a graph of an example peak voltage across an AC switching control circuit versus clamping angle for across the AC switching control circuit for a voltage waveform with a 300V DC output.

An AC switching control circuit (e.g., AC switching control circuit 460) can effectively control the output current based on the input current (e.g., current induced at resonant circuit 422). However, the range of operation of the AC switching control circuit is limited. In particular, as the clamping angle increases (e.g., the longer the switches are closed, the less current going out to the battery), the peak voltage across the switches $S_1$ and $S_2$ increases. For example, FIG. 5 illustrates a graph of an example voltage across the switches $S_1$ and $S_2$ for different clamping angles. As shown, line 510 represents the voltage across the switches $S_1$ and $S_2$ at a clamping angle of 0 for a voltage waveform with a DC voltage as represented by line 505. As shown, line 515 represents the voltage across the switches $S_1$ and $S_2$ at a clamping angle of θ for a voltage waveform with a DC voltage as represented by line 505. As shown the peak voltage $V_{2Bpeak}$ of line 515 is greater than the peak voltage $V_{2Apeak}$ of line 510. Further, FIG. 6 illustrates a graph of an example peak voltage versus clamping angle for a voltage waveform with a 300V DC output. As shown, the Y-axis represents peak voltage, and the X-axis represents clamping angle. As the clamping angle increases, the peak voltage increases.

The clamping angle may correspond to a duty cycle or amount of time the switches $S_1$ and $S_2$ are closed during a period of the AC voltage waveform. This duty cycle, therefore, is synchronized to the AC voltage or current waveform. Therefore, the AC switching control circuit may be designed to have a higher voltage rating for a larger control range (e.g., if primary power control is ineffective or not performed by a wireless power transmitter). This may require large overhead on the components of the AC switching control circuit, such as requiring larger and/or costlier components.

Accordingly, aspects of the present disclosure provide techniques for power control at a wireless power receiver using both an AC switching control circuit and a DC-DC converter. In particular, in certain aspects, the DC-DC converter can be used to limit the voltage at the AC switching control, and the AC switching control can be used to limit the current at the DC-DC converter. Further, in certain aspects, control schemes are provided to control the AC switching control and the DC-DC converter to provide appropriate voltage and current limiting.

Figure 7:
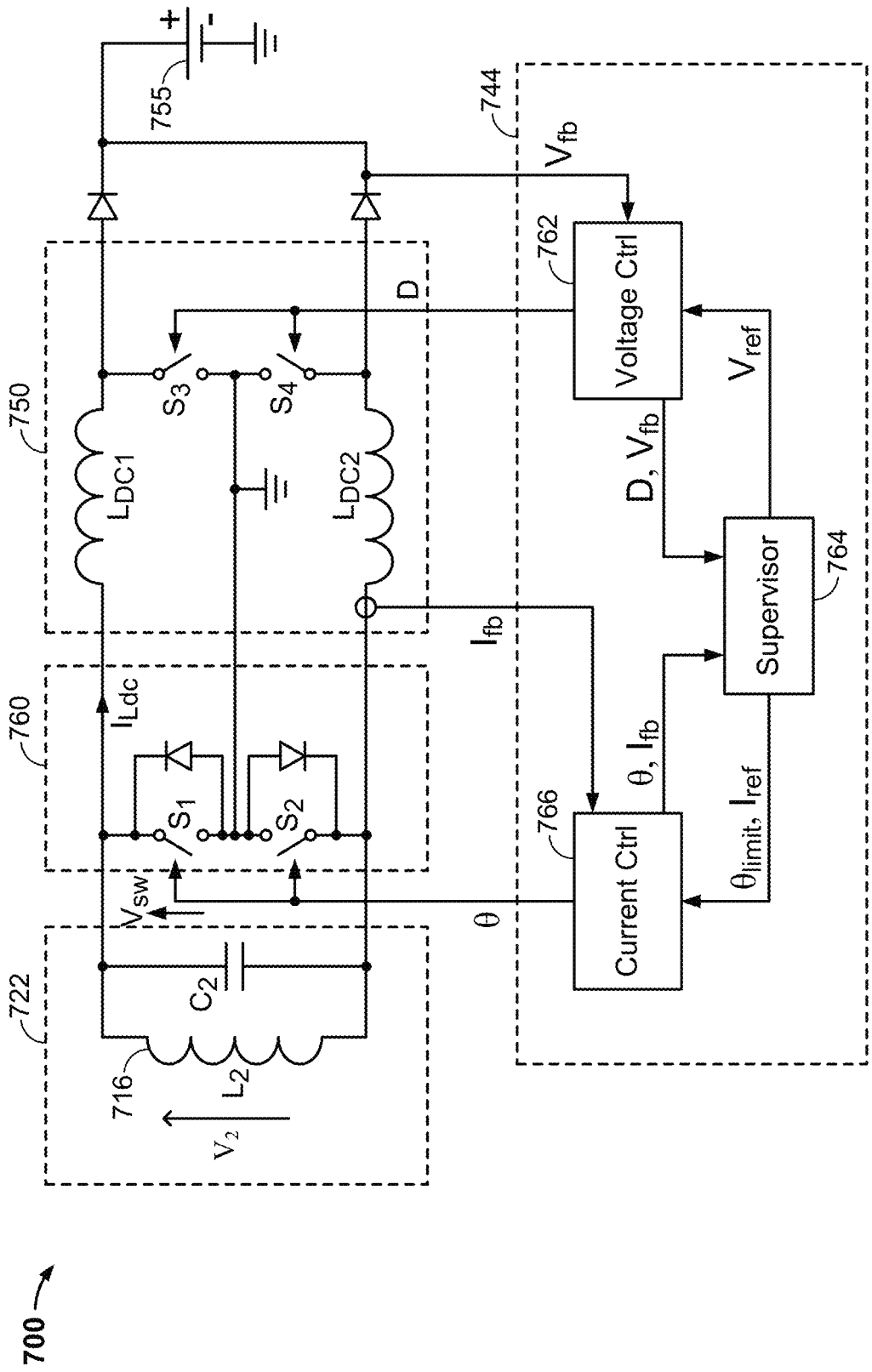
FIG. 7 is a schematic diagram of exemplary components of a wireless power receiver configured to perform power control.

FIG. 7 is a schematic diagram of exemplary components of a wireless power receiver 700 configured to perform power control. Wireless power receiver 700 may be an example implementation of a vehicle pad, an electric vehicle wireless charging unit 114, 214, 314, etc., or some other wireless power receiving device including a power transfer element (e.g., vehicle power transfer element 116, 216, 316, etc.). As shown, wireless power receiver 700 includes a vehicle power transfer element 716 having an inductance L2. The wireless power receiver 700 further includes an electric vehicle resonant circuit 722 (including the electric vehicle power transfer element 716 and tuning capacitor $C_2$), for tuning a resonant frequency of the wireless power receiver 700. In some aspects, wireless power receiver 700 is configured as a parallel LC circuit with electric vehicle power transfer element 716 in parallel with tuning capacitor $C_2$.

The wireless power receiver 700 further includes an (e.g., synchronous) AC switching control circuit 760. The AC switching control circuit 760 includes switches $S_1$ and $S_2$ configured to selectively clamp or short the AC signal output from the resonant circuit 722 to ground. The diodes shown in parallel to switches $S_1$ and $S_2$ may, in certain aspects correspond to the body diodes of the switches themselves, which may act as a rectifier (e.g., similar to rectifier 440). In some aspects, the diodes may be separate diodes to act as a rectifier.

The DC signal output of the AC switching control circuit 760 is further coupled to and received at a DC-DC converter 750 (e.g., boost converter, buck converter, etc.) of the wireless power receiver 700. The DC-DC converter 750 includes an inductor $L_{DC1}$ having an inductance $L_{DC1}$ and an inductor $L_{DC2}$ having an inductance $L_{DC2}$ each coupled to the output of the AC switching control circuit 760 as shown. The inductors $L_{DC1}$ and $L_{DC2}$ are in parallel to each other. The DC-DC converter 750 further includes switches $S_3$ and $S_4$ configured to selectively couple the output of the inductors $L_{DC1}$ and $L_{DC2}$ respectively to ground. The output of the inductors $L_{DC1}$ and $L_{DC2}$ are further coupled via respective diodes to the load 755 (e.g., battery).

In some aspects, the DC-DC converter 750 is configured to control (e.g., lower) the resonant voltage of the wireless power receiver 700, and accordingly, a peak voltage across the switches of the AC switching control circuit 760. Therefore, the clamping angle of the AC switching control circuit 760 can be increased, while keeping the peak voltages at lower levels and using components in the AC switching control circuit 760 rated for lower voltages. Thus, the current at the inductors of the DC-DC converter 750 can be reduced by the AC switching control circuit 760 operating at a higher clamping angle, thereby allowing use of components in the DC-DC converter 750 rated for lower currents. In some aspects, the expressions (e.g., equations) describing (1) the relationship between the rms resonant voltage $V_2$ (as shown across vehicle power transfer element 716) and the duty cycle (D) of the DC-DC converter 750 and (2) the relationship between the peak voltage across the switches ($\hat{V}_{SW}$) and the clamping angle (θ) of the AC switching control circuit 760 are listed below where $V_{Bat}$ is the output battery voltage of the load 755 and θ is the clamping angle in degrees are listed below.

$$V_2 = \frac{\pi}{\sqrt{2}}(1-D)V_{Bat} \qquad (1)$$

$$\hat{V}_2 = \hat{V}_{SW} = \frac{\pi(1-D)V_{Bat}}{1-\frac{\theta}{180}} \qquad (2)$$

The wireless power receiver 700 further includes a controller 744 configured to control the opening of switches $S_1$ through $S_4$. In some aspects, the controller 744 comprises one or more controllers, processors, integrated circuits, circuits, etc., such as electric vehicle controller 344. As shown, the controller 744 includes a voltage control circuit 762, a current control circuit 766, and a supervisor circuit 764. Though shown as separate circuits, the functions of the voltage control circuit 762, current control circuit 766, and supervisor circuit 764 may be implemented as a single component or a combination of multiple components. In some aspects, the controller 744 is configured to control the opening of switches $S_1$ through $S_4$ to control a duty cycle of the DC-DC converter 750 and a clamping angle of the AC switching control circuit 760 as discussed with respect to FIG. 8.

Figure 7A:
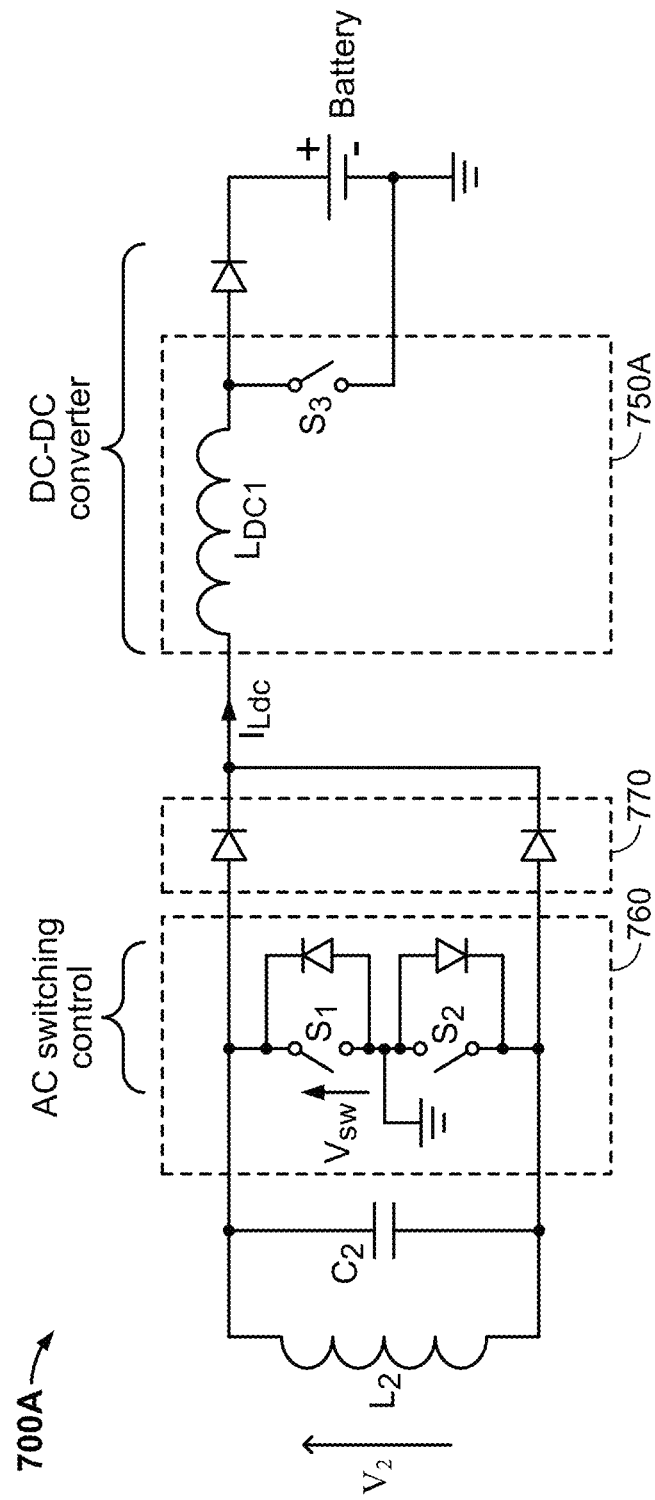
FIG. 7A is a schematic diagram of exemplary components of a wireless power receiver configured to perform power control.

FIG. 7A is a schematic diagram of exemplary components of a wireless power receiver 700A configured to perform power control. As shown, wireless power receiver 700A is similar to wireless power receiver 700 except that power receiver 700A includes a full bridge rectifier 770 as shown comprising diodes coupled to the output of AC switching control circuit 760. Further, the wireless power receiver 700A includes a DC-DC converter 750A instead of DC-DC converter 750. The DC-DC converter 750A includes a single switch $S_3$ and a single inductor $L_{DC1}$. The DC-DC converter 750A may be controlled similar to the DC-DC converter 750 as discussed herein.

In certain aspects, the diodes of the full bridge rectifier 770 are silicon-carbide diodes. However, in certain aspects, the diodes are silicon diodes instead of silicon-carbide diodes, such as to save on costs. Silicon diodes, however, have certain characteristics that may reduce efficiency of the rectification at wireless power receiver 700A depending on operation of the wireless power receiver 700A. For example, when silicon diodes are forward biased they accumulate charge. Further, the faster the silicon diode is turned off, the faster the charge depletes from the silicon diode. Accordingly, if the silicon diode is turned off quickly the accumulated charge is released more quickly as a high current pulse over a short time period, as opposed to if the silicon diode is turned off slowly so the accumulated charge is released as a lower current for a longer period of time. The released current is a reverse current that goes in the reverse direction of the diode (e.g., through electric vehicle power transfer element 716 and tuning capacitor $C_2$). This unwanted high current circulating in the circuit creates losses and electromagnetic interference issues, which reduces efficiency. For example, if the clamping angle θ of switches $S_2$ and $S_1$ is 0, then there may be no AC switching, and the diodes of the full bridge rectifier 770 may be turned on and off abruptly potentially leading to reverse current through the diodes.

Accordingly, in certain aspects, the clamping angle θ of switches $S_2$ and $S_1$ may be set to a value above (e.g., a small amount above) zero (e.g., have a minimum floor above 0) to ensure that the diodes of the full bridge rectifier 770 are not turned on and off abruptly to avoid high reverse current issues. For example, in certain aspects described herein, the control algorithms for the clamping angle of switches of an AC switching control circuit may indicate a clamping angle of zero at a given time for power regulation. Accordingly, in certain such aspects, such as where silicon diodes are used for rectification, even if the control algorithm indicates a clamping angle of zero, some minimum clamping angle above zero is used instead to control the switches of the AC switching control circuit. The duty cycle D of the corresponding DC-DC converter may also be adjusted to compensate for the non-zero clamping angle. For example, in certain aspects, the overall control algorithms described herein for determining a clamping angle of a AC switching control circuit and a duty cycle D of a DC-DC converter may be modified so that the clamping angle of the AC switching control circuit does not go below the minimum floor value that is above 0.

Figure 7B:
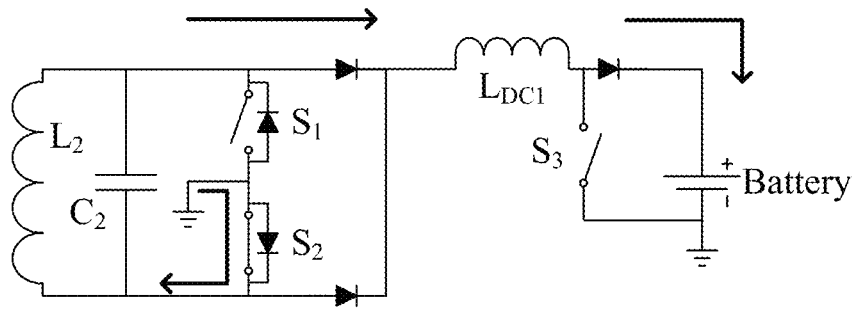
FIGS. 7B-7D illustrate exemplary states of switches corresponding to the exemplary components of a wireless power receiver configured to perform power control of FIG. 7A based on the signals illustrated in the graph of FIG. 4B.

For example, FIG. 7B corresponds to the state of wireless power receiver 700A somewhere between the time to and $t_1$ of FIG. 4B where switch $S_1$ is open and switch $S_2$ is closed. During this time, the diode of full bridge rectifier 770 shown at the top of the figure is forward biased and accumulates charge. At FIG. 7D, which corresponds to the state of wireless power receiver 700A somewhere between the time $t_2$ and $t_3$ of FIG. 4B switch $S_2$ is open and switch $S_1$ is closed. Accordingly, the diode of full bridge rectifier 770 shown at the top of the figure is turned off and releases charge as a reverse current. In certain aspects, instead of going straight from FIG. 7B to FIG. 7D (indicating zero clamping angle), a non-zero clamping angle is used so that there is an intermediate state of wireless power receiver 700A between FIGS. 7B and 7D, which is shown as 7C.

Figure 7C:
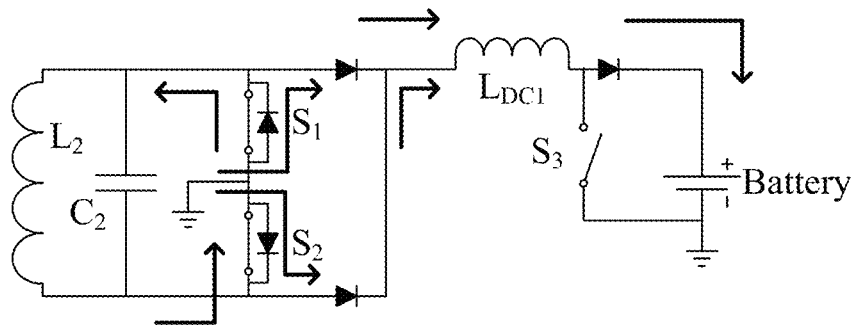
Figure 7D:
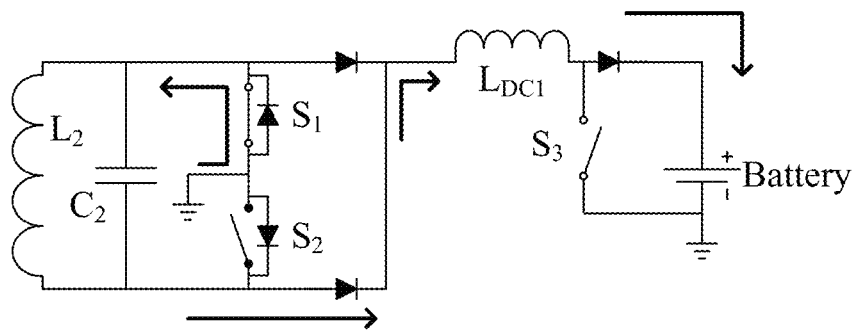

In particular, FIG. 7C corresponds to the state of wireless power receiver 700A somewhere between the time $t_1$ and $t_2$ of FIG. 4B where switch $S_1$ is closed and switch $S_2$ is closed. Accordingly, the current coming out of resonant circuit 722 circulates through switch $S_1$ and switch $S_2$. The current then has two potential paths: 1) through switch $S_1$ and the top diode of the full bridge rectifier 770; and 2) through switch $S_2$ and the bottom diode of the full bridge rectifier 770. Accordingly, there is still some reduced current through the top diode of the full bridge rectifier 770, which increases the time period for turning off the diode, which reduces the peak current released from the top diode of the full bridge rectifier 770.

Figure 8:
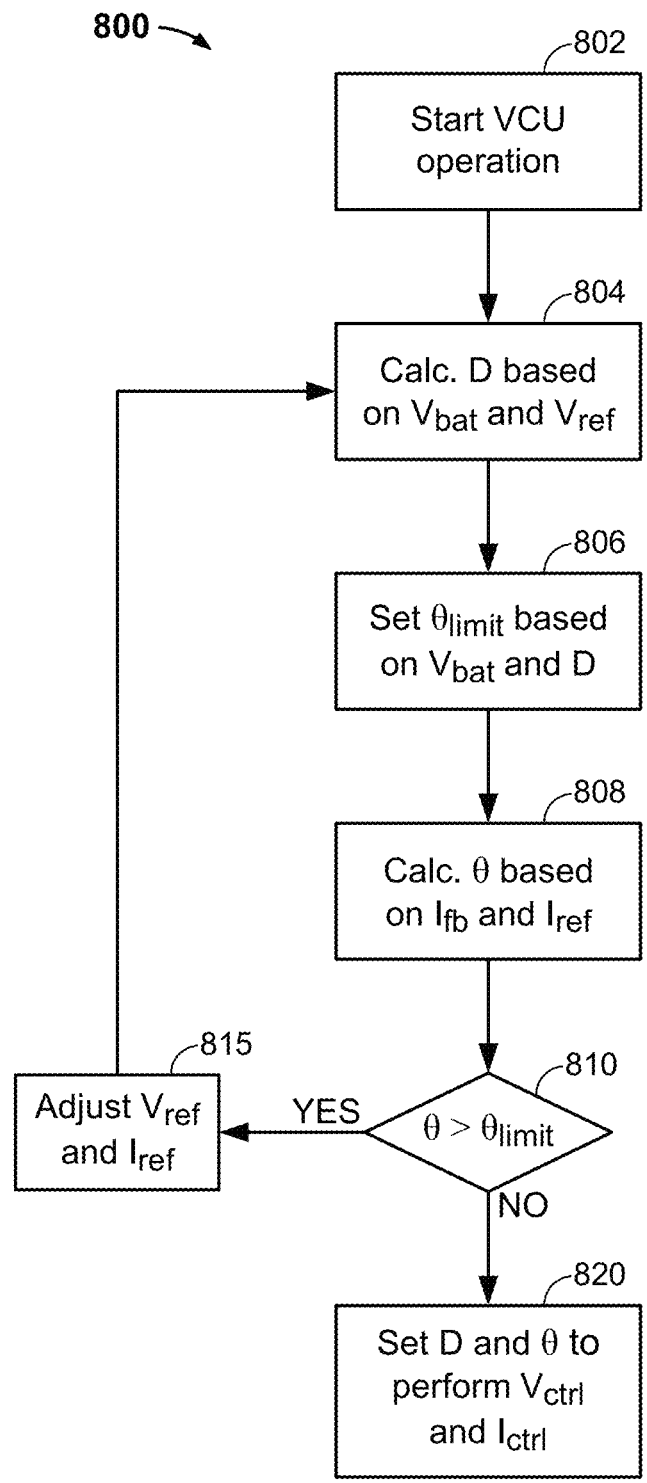
FIG. 8 is a flowchart illustrating example operations for controlling power at a wireless power receiver.

FIG. 8 is a flowchart illustrating example operations 800 for controlling power at a wireless power receiver. For example, the operations 800 may be performed by a controller, such as controller 744, to control a DC-DC converter, such as DC-DC converter 750 or 750A, and an AC switching control circuit, such as AC switching control circuit 760, of a wireless power receiver, such as wireless power receiver 700 or 700A.

At 802, the controller starts operation. For example, the wireless power receiver may receive wireless power from a wireless power transmitter, and the controller may set the duty cycle of the DC-DC converter and the clamping angle of the AC switching control circuit to default values (e.g., predetermined values, configurable values, set values, etc.). At 804, the controller calculates a duty cycle (D) for the DC-DC converter based on a voltage at a load (e.g., load 755) ($V_{fb}$) powered by the wireless power receiver and a desired resonant voltage ($V_{ref}$) across the resonant tank of the wireless power receiver that is the input voltage to the DC-DC converter. In some aspects, $V_{ref}$ is set by a supervisor circuit (e.g., supervisor circuit 764) of the controller. In some aspects, $V_{ref}$ is initially set to a default value. In some aspects, a voltage control circuit (e.g., voltage control circuit 762) is configured to measure $V_{fb}$, receive $V_{ref}$ from the supervisor circuit, and calculate D for the DC-DC converter. For example, in certain aspects, the duty cycle D is calculated based on equation (1) as follows:

$$(1-D) = \frac{\sqrt{2}\,V_2}{\pi V_{Bat}} = \frac{\sqrt{2}\,V_{ref}}{\pi V_{fb}}$$

At 806, the controller calculates a maximum possible clamping angle ($θ_{limit}$) for the AC switching control circuit based on D and $V_{fb}$. The maximum possible clamping angle sets a peak of the voltage through the AC switching control circuit. In some aspects, the maximum clamping angle is a function of D and a ratio of the maximum peak voltage the AC switching control circuit is configured to handle to $V_{fb}$. In some aspects, the supervisor circuit receives D and $V_{fb}$ from the voltage control circuit and calculates $θ_{limit}$. For example, in certain aspects, the maximum possible clamping angle $θ_{limit}$ is calculated based on equation (2) as follows:

$$θ_{limit} = 180\left(1 - \frac{\pi(1-D)V_{fb}}{\hat{V}_{SW\_max}}\right),$$

where $\hat{V}_{SW\_max}$ is the maximum allowable peak voltage the AC switching control circuit is configured to handle.

At 808, the controller calculates an operational or actual clamping angle (θ) to maintain a desired current ($I_{ref}$) through the DC-DC converter based on $I_{ref}$ and the actual current ($I_{fb}$) at the output of the AC switching control circuit and going through the DC-DC converter. In some aspects, $I_{ref}$ is set by the supervisor circuit of the controller. In some aspects, $I_{ref}$ is initially set to a default value. In some aspects, a current control circuit (e.g., current control circuit 766) is configured to measure $I_{fb}$, receive $I_{ref}$ from the supervisor circuit, and calculate θ for the AC switching control circuit.

At 810, the controller determines if θ is greater than $θ_{limit}$. For example, the supervisor circuit determines if θ is greater than $θ_{limit}$. If at 810, the controller determines θ is greater than $θ_{limit}$, operations 800 continue to 815. At 815, the controller (e.g., supervisor circuit) adjusts at least one of $I_{ref}$ or $V_{ref}$ to change the duty cycle D (e.g., increase D) of the DC-DC converter to generate a lower resonant voltage, so that $\theta_{limit}$ is increased. For example, in certain aspects, the controller selects a new value for the clamping angle $\theta_{new}$ that is between $\theta$ and $\theta_{limit}$, and uses $\theta_{new}$ to calculate an adjusted $V_{ref}$ as follows using equation (3):

$$V_{ref} = \frac{\hat{V}_{SW\_max}\left(1 - \frac{\theta_{new}}{180}\right)}{\sqrt{2}} \quad (3)$$

Further, in certain aspects, using the relationship between power, $I_{ref}$ and $V_{ref}$, the controller calculates an adjusted $I_{ref}$ as follows using equation (4):

$$P = \frac{2\sqrt{2}}{\pi} V_{ref} I_{ref} \quad (4)$$

The operations 800 then return to 804.

If at 810, the controller determines $\theta$ is not greater than $\theta_{limit}$, operations 800 continue to 820. At 820, the controller operates the DC-DC converter with a duty cycle D as calculated at 804 and operates the AC switching control circuit with a clamping angle $\theta$ as calculated at 808. In some aspects, the supervisor circuit indicates to the voltage control circuit to operate the DC-DC converter with the duty cycle D and indicates to the current control circuit to operate the AC switching control circuit with a clamping angle $\theta$. Accordingly, the controller controls the power (I and V) at the wireless power receiver.

Figure 9:
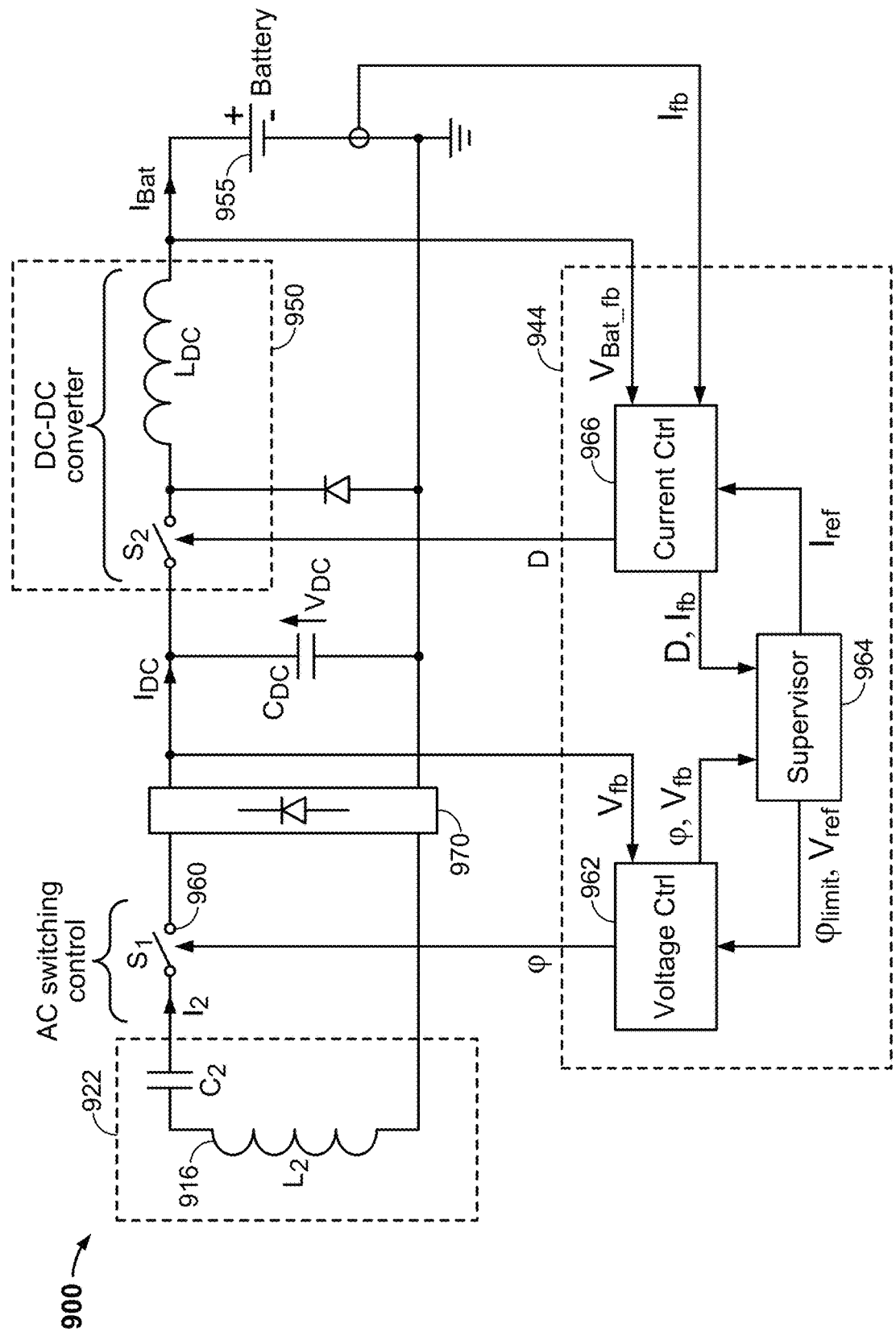
FIG. 9 is a schematic diagram of exemplary components of a wireless power receiver configured to perform power control.

FIG. 9 is a schematic diagram of exemplary components of a wireless power receiver 900 configured to perform power control. Wireless power receiver 900 may be an example implementation of a vehicle pad, an electric vehicle wireless charging unit 114, 214, 314, etc., or some other wireless power receiving device including a power transfer element (e.g., vehicle power transfer element 116, 216, 316, etc.). As shown, wireless power receiver 900 includes a vehicle power transfer element 916 having an inductance $L_2$. The wireless power receiver 900 further includes an electric vehicle resonant circuit 922 (including the electric vehicle power transfer element 916 and tuning capacitor $C_2$), for tuning a resonant frequency of the wireless power receiver 900. In some aspects, wireless power receiver 900 is configured as a series LC circuit with electric vehicle power transfer element 916 in series with tuning capacitor $C_2$.

The wireless power receiver 900 further includes an AC switching control circuit 960. The AC switching control circuit 960 includes a switch $S_1$. It should be noted that though AC switching control circuit 960 is shown with only a single switch $S_1$, the AC switching control circuit 960 may be implemented in other ways, such as having two switches connected back to back similar to switches $S_1$ and $S_2$ shown in FIG. 7. The wireless power receiver 900 further includes a rectifier 970 coupled in parallel to the resonant circuit 922. The rectifier 970 is configured to convert an AC output of the AC switching control circuit 960 to a DC output.

The DC signal output of the rectifier 970 (and correspondingly the AC switching control circuit 960) is further coupled to and received at a DC-DC converter 950 (e.g., boost converter, buck converter, etc.) of the wireless power receiver 900. The DC-DC converter 950 includes an inductor $L_{DC}$ and a switch $S_2$ coupled in series. The output of inductor $L_{DC}$ is further coupled to the load 955 (e.g., battery).

The wireless power receiver 900 further includes a capacitor $C_{DC}$ coupled in parallel with the rectifier 970 at a node between the rectifier 970 and switch $S_2$ and a reference voltage (e.g., ground). The wireless power receiver 900 further includes a diode coupled in parallel with the rectifier 970 between a node at the coupling point of the switch $S_2$ and inductor $L_{DC}$ and the reference voltage.

As discussed with respect to a wireless power receiver (e.g., wireless power receiver 700) configured as a parallel LC circuit, an AC switching control circuit may perform current control of the wireless power receiver and the DC-DC converter may perform voltage control of the wireless power receiver. For a wireless power receiver (e.g., wireless power receiver 900) configured as a series LC circuit, an AC switching control circuit may perform voltage control of the wireless power receiver and the DC-DC converter may perform current control of the wireless power receiver. Accordingly, as shown, the AC switching control circuit 960 is configured to control a voltage supplied to the DC-DC converter 950, and the DC-DC converter 950 is configured to control a current supplied to the load 955.

In certain aspects, the switch $S_1$ of the AC switching control circuit 960 may be controlled to control a voltage output of the AC switching control circuit 960. For example, the switch $S_1$ may be controlled to be selectively opened for a portion of a period of the AC power signal induced at the resonant circuit 922 and closed for the remainder of the period. The portion of the period the switch $S_1$ is open may be referred to as $\varphi$. The $\varphi$ may correspond to a duty cycle or amount of time the switch $S_1$ is open during a period of the AC voltage waveform. This duty cycle, therefore, is synchronized to the AC voltage or current waveform. The larger $\varphi$, the higher the peak current I at the AC switching control circuit 960, but the lower the voltage output of the AC switching control circuit 960. The smaller $\varphi$, the lower the peak current I at the AC switching control circuit 960, but the higher the voltage output of the AC switching control circuit 960. In some aspects, the expression (e.g., equation) describing (5) the relationship between the peak current $\hat{I}_{S1}$ at the AC switching control circuit 960 and $\varphi$ is listed below, where $I_{Bat}$ is the output battery current of the load 955.

$$\hat{I}_2 = \hat{I}_{S1} = \frac{\frac{\pi}{2} D I_{Bat}}{1 - \frac{\varphi}{180}} \quad (5)$$

In some aspects, the DC-DC converter 950 is configured to control (e.g., lower) the resonant current of the wireless power receiver 900, and accordingly, a peak current across the switch $S_1$ of the AC switching control circuit 960. Therefore, the duty cycle $\varphi$ of the AC switching control circuit 960 can be increased, while keeping the peak currents at lower levels and using components in the AC switching control circuit 960 rated for lower currents. Thus, the voltage at the switch $S_2$ and inductor $L_{DC}$ of the DC-DC converter 950 can be reduced by the AC switching control circuit 960 operating at a higher duty cycle $\varphi$, thereby allowing use of components in the DC-DC converter 950 rated for lower voltages. In some aspects, the expression (e.g., equation) describing (6) the relationship between the rms resonant current $I_2$ of the wireless power receiver 900, the duty cycle (D) of the DC-DC converter 950, and the current supplied to the load 955 ($I_{Bat}$) is listed below.

$$I_2 = \frac{\pi}{2\sqrt{2}} DI_{Bat} \quad (6)$$

The wireless power receiver 900 further includes a controller 944 configured to control the opening of switches $S_1$ and $S_2$. In some aspects, the controller 944 comprises one or more controllers, processors, integrated circuits, circuits, etc., such as electric vehicle controller 344. As shown, the controller 944 includes a voltage control circuit 962, a current control circuit 966, and a supervisor circuit 964. Though shown as separate circuits, the functions of the voltage control circuit 962, current control circuit 966, and supervisor circuit 964 may be implemented as a single component or a combination of multiple components. In some aspects, the controller 944 is configured to control the opening of switches $S_1$ and $S_2$ to control a duty cycle D of the DC-DC converter 950 and a duty cycle φ of the AC switching control circuit 960 as discussed with respect to FIG. 10.

Figure 10:
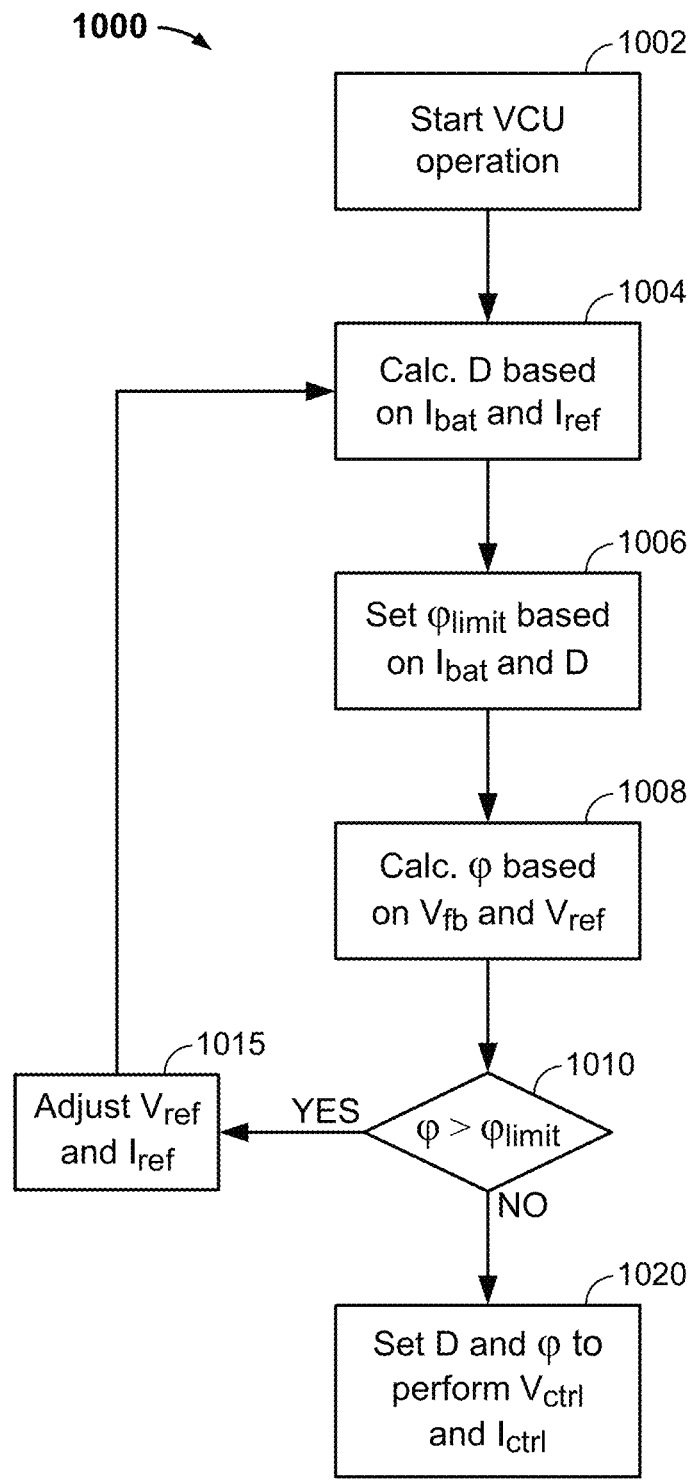
FIG. 10 is a flowchart illustrating example operations for controlling power at a wireless power receiver.

FIG. 10 is a flowchart illustrating example operations 1000 for controlling power at a wireless power receiver. For example, the operations 1000 may be performed by a controller, such as controller 944, to control a DC-DC converter, such as DC-DC converter 950, and an AC switching control circuit, such as AC switching control circuit 960, of a wireless power receiver, such as wireless power receiver 900.

At 1002, the controller starts operation. For example, the wireless power receiver may receive wireless power from a wireless power transmitter, and the controller may set the duty cycle D of the DC-DC converter and the duty cycle φ of the AC switching control circuit to default values (e.g., predetermined values, configurable values, set values, etc.). At 1004, the controller calculates a duty cycle (D) for the DC-DC converter based on a current at a load (e.g., load 755) ($I_{fb}$) powered by the wireless power receiver and a desired resonant current ($I_{ref}$) across the resonant tank of the wireless power receiver that is the input current to the DC-DC converter. In some aspects, $I_{ref}$ is set by a supervisor circuit (e.g., supervisor circuit 764) of the controller. In some aspects, $I_{ref}$ is initially set to a default value. In some aspects, a current control circuit (e.g., current control circuit 966) is configured to measure $I_{fb}$, receive $I_{ref}$ from the supervisor circuit, and calculate D for the DC-DC converter. For example, in certain aspects, the duty cycle D is calculated based on equation (6) as follows:

$$D = \frac{2\sqrt{2}}{\pi} \frac{I_{ref}}{I_{Bat}} = \frac{2\sqrt{2}}{\pi} \frac{I_{ref}}{I_{fb}}$$

At 1006, the controller calculates a maximum possible duty cycle ($\varphi_{limit}$) for the AC switching control circuit based on D and $I_{fb}$. The maximum possible duty cycle $\varphi_{limit}$ sets a peak of the current through the AC switching control circuit. In some aspects, the maximum possible duty cycle $\varphi_{limit}$ is a function of D and a ratio of the maximum peak current the AC switching control circuit is configured to handle to $I_{fb}$. In some aspects, the supervisor circuit receives D and $I_{fb}$ from the current control circuit and calculates $\varphi_{limit}$. For example, in certain aspects, the maximum possible duty cycle $\varphi_{limit}$ is calculated based on equation (5) as follows:

$$\varphi_{limit} = 180 \left(1 - \frac{\frac{\pi}{2} DI_{Bat}}{\hat{I}_{S1\_max}}\right),$$

where $\hat{I}_{S1\_max}$ is the maximum allowable peak current the AC switching control circuit is configured to handle.

At 1008, the controller calculates an operational or actual duty cycle (φ) to maintain a desired voltage ($V_{ref}$) through the DC-DC converter based on $V_{ref}$ and the actual voltage ($V_{fb}$) at the output of the AC switching control circuit (e.g., at the output of a rectifier coupled to the AC switching control circuit) and going through the DC-DC converter. In some aspects, $V_{ref}$ is set by the supervisor circuit of the controller. In some aspects, $V_{ref}$ is initially set to a default value. In some aspects, a voltage control circuit (e.g., voltage control circuit 962) is configured to measure $V_{fb}$, receive $V_{ref}$ from the supervisor circuit, and calculate φ for the AC switching control circuit.

At 1010, the controller determines if φ is greater than $\varphi_{limit}$. For example, the supervisor circuit determines if φ is greater than $\varphi_{limit}$. If at 1010, the controller determines φ is greater than $\varphi_{limit}$, operations 1000 continue to 1015. At 1015, the controller (e.g., supervisor circuit 964) adjusts at least one of $I_{ref}$ or $V_{ref}$ to change the duty cycle D (e.g., decrease D) of the DC-DC converter to generate a lower resonant current, so that $\varphi_{limit}$ is increased. For example, in certain aspects, the controller selects a new value for the duty cycle $\varphi_{new}$ that is between φ and $\varphi_{limit}$, and uses $\varphi_{new}$ to calculate an adjusted $I_{ref}$ as follows using equation (7):

$$I_{ref} = \frac{\hat{I}_{S1max}}{\sqrt{2}} \left(1 - \frac{\varphi_{new}}{180}\right) \quad (7)$$

Further, in certain aspects, using the relationship between power, $I_{ref}$ and $V_{ref}$, the controller calculates an adjusted $V_{ref}$ using equation (4). The operations 1000 then return to 1004.

If at 1010, the controller determines φ is not greater than $\varphi_{limit}$, operations 1000 continue to 1020. At 1020, the controller operates the DC-DC converter with a duty cycle D as calculated at 1004 and operates the AC switching control circuit with a duty cycle φ as calculated at 1008. In some aspects, the supervisor circuit indicates to the current control circuit to operate the DC-DC converter with the duty cycle D and indicates to the voltage control circuit to operate the AC switching control circuit with a duty cycle (p. Accordingly, the controller controls the power (I and V) at the wireless power receiver.

Figure 11:
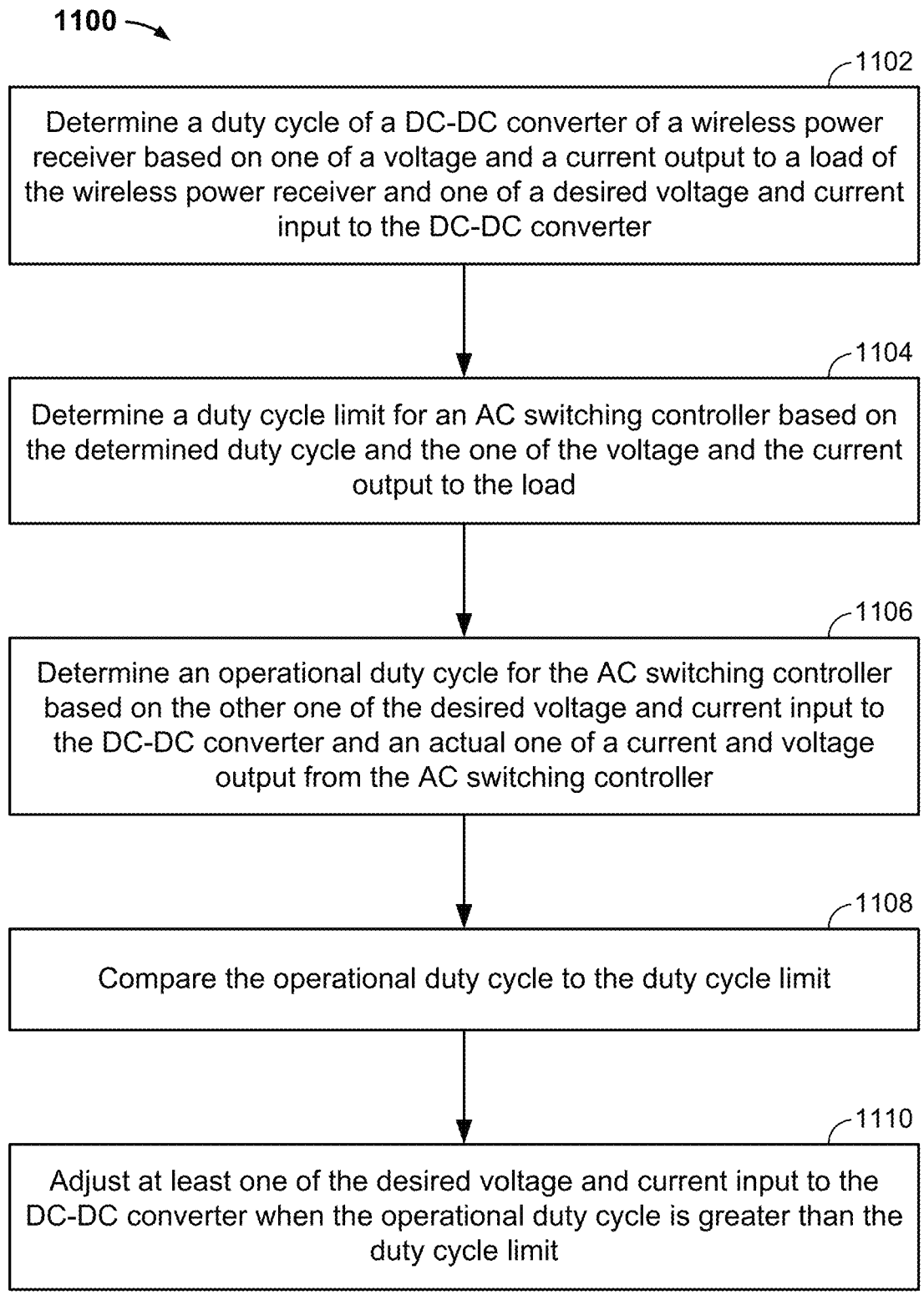
FIG. 11 is a flowchart illustrating example operations for controlling power at a wireless power receiver.

FIG. 11 is a flowchart illustrating example operations 1100 for controlling power at a wireless power receiver. For example, the operations 1100 may be performed by a controller, such as controller 744 or 944, to control a DC-DC converter, such as DC-DC converter 750 or 950, and an AC switching control circuit, such as AC switching control circuit 760 or 960, of a wireless power receiver, such as wireless power receiver 700, 700A, or 900.

At 1102, a duty cycle of a DC-DC converter of the wireless power receiver is determined based on one of a voltage and a current output to a load of the wireless power receiver and one of a desired voltage and current input to the DC-DC converter. At 1104, a duty cycle limit for an AC switching controller is determined based on the determined duty cycle and the one of the voltage and the current output to the load.

At 1106, an operational duty cycle for the AC switching controller is determined based on the other one of the desired voltage and current input to the DC-DC converter and an actual one of a current and voltage output from the AC switching controller. At 1108, the operational duty cycle is compared to the duty cycle limit. At 1110, at least one of the desired voltage and current input to the DC-DC converter is adjusted when the operational duty cycle is greater than the duty cycle limit.

FIG. 12 is a flowchart illustrating example operations 1200 for controlling power at a wireless power receiver. For example, the operations 1200 may be performed by a controller, such as controller 744 or 944, to control a DC-DC converter, such as DC-DC converter 750 or 950, and an AC switching control circuit, such as AC switching control circuit 760 or 960, of a wireless power receiver, such as wireless power receiver 700, 700A, or 900.

At 1202, a duty cycle of a DC-DC converter and a duty cycle of an AC switching controller are adjusted to control a voltage and a current through the wireless power receiver.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for controlling power transfer at a wireless power receiver, the method comprising:
   wirelessly coupling power at a power transfer element of the wireless power receiver via a wireless field to generate a voltage and current through the wireless power receiver; and
   adjusting a duty cycle of a DC-DC converter and a duty cycle of an AC switching controller to control the voltage and the current through the wireless power receiver.

2. The method of claim 1, wherein adjusting the duty cycle of the AC switching controller comprises setting a minimum floor value for the duty cycle of the AC switching controller to be above zero.

3. The method of claim 1, wherein adjusting the duty cycle of the AC switching controller comprises adjusting the duty cycle of the AC switching controller to a first level that limits a level of current through an inductor of the DC-DC converter and wherein adjusting the duty cycle of the DC-DC converter comprises adjusting the duty cycle of the DC-DC converter to a second level that reduces an upper limit voltage across one or more switches of the AC switching controller.

4. The method of claim 3, wherein the second level corresponds to a level that reduces the upper limit voltage for a corresponding increase in a clamping angle corresponding to the duty cycle of the AC switching controller.

5. The method of claim 1, wherein the duty cycle of the DC-DC converter is adjusted based on at least one of a desired current and a desired voltage through the wireless power receiver, and wherein the duty cycle of the AC switching controller is adjusted based on the other of the at least one of the desired current and the desired voltage through the wireless power receiver.

6. The method of claim 1, wherein the duty cycle of the AC switching controller is adjusted based on the duty cycle of the DC-DC converter, and wherein the duty cycle of the DC-DC converter is adjusted based on a voltage or a current of a load powered by the wireless power receiver.

7. A wireless power receiver comprising:
a DC-DC converter;
an AC switching controller; and
a resonant circuit configured to couple to a wireless power field, wherein an input of the AC switching controller is coupled to an output of the resonant circuit, and wherein an output of the AC switching controller is coupled to an input of the DC-DC converter;
a rectifier comprising silicon diodes; and
a controller configured to control a clamping angle of the AC switching controller to have a minimum value above zero.

8. The wireless power receiver of claim 7, wherein the DC-DC converter is configured to limit a voltage across one or more switches of the AC switching controller, and the AC switching controller is configured to limit a current across an inductor of the DC-DC converter.

9. The wireless power receiver of claim 7, wherein the DC-DC converter comprises one or more first switches, wherein the AC switching controller comprises one or more second switches, and further comprising a controller configured to control a first duty cycle of the one or more first switches and a second duty cycle of the one or more second switches.

10. The wireless power receiver of claim 7, wherein the controller is configured to control the first duty cycle and the second duty cycle based on a desired current and a desired voltage through the wireless power receiver.

11. A wireless power receiver comprising:
a DC-DC converter comprising one or more first switches;
an AC switching controller comprising one or more second switches;
a controller configured to control a first duty cycle of the one or more first switches and a second duty cycle of the one or more second switches, wherein the controller is configured to control the second duty cycle based on the first duty cycle; and
a resonant circuit configured to couple to a wireless power field, wherein an input of the AC switching controller is coupled to an output of the resonant circuit, and wherein an output of the AC switching controller is coupled to an input of the DC-DC converter.

12. The wireless power receiver of claim 11, wherein the controller is configured to control the second duty cycle to a first level that limits a level of current through an inductor of the DC-DC converter and to control the first duty cycle to a second level that reduces an upper limit voltage across the one or more second switches.

13. A wireless power receiver comprising:
a DC-DC converter comprising one or more first switches;
an AC switching controller comprising one or more second switches;
a controller configured to control a first duty cycle of the one or more first switches and a second duty cycle of the one or more second switches;
a resonant circuit configured to couple to a wireless power field, wherein an input of the AC switching controller is coupled to an output of the resonant circuit, and wherein an output of the AC switching controller is coupled to an input of the DC-DC converter; and
a load, wherein the duty cycle of the DC-DC converter is adjusted based on a voltage or a current of the load powered by the wireless power receiver.

14. A wireless power receiver comprising:
a DC-DC converter comprising one or more first switches;
an AC switching controller comprising one or more second switches;
a resonant circuit configured to couple to a wireless power field, wherein an input of the AC switching controller is coupled to an output of the resonant circuit, and wherein an output of the AC switching controller is coupled to an input of the DC-DC converter; and
a controller configured to:
control a first duty cycle of the one or more first switches and a second duty cycle of the one or more second switches;
determine the first duty cycle based on one of a voltage and a current output to a load of the wireless power receiver and one of a desired voltage and current input to the DC-DC converter;
determine a limit for the second duty cycle based on the determined first duty cycle and the one of the voltage and the current output to the load;
determine an operational value for the second duty cycle based on the other one of the desired voltage and current input to the DC-DC converter and an actual one of a current and voltage output from the AC switching controller;
compare the operational value to the limit; and
adjust at least one of the desired voltage and current input to the DC-DC converter when the operational value is greater than the limit.

15. A wireless power receiver comprising:
means for determining a duty cycle of a DC-DC converter of the wireless power receiver based on one of a voltage and a current output to a load of the wireless power receiver and one of a desired voltage and current input to the DC-DC converter;
means for determining a duty cycle limit for an AC switching controller based on the determined duty cycle and the one of the voltage and the current output to the load;
means for determining an operational duty cycle for the AC switching controller based on the other one of the desired voltage and current input to the DC-DC converter and an actual one of a current and voltage output from the AC switching controller;

means for comparing the operational duty cycle to the duty cycle limit; and means for adjusting at least one of the desired voltage and current input to the DC-DC converter when the operational duty cycle is greater than the duty cycle limit.

16. The wireless power receiver of claim 15, wherein the DC-DC converter is configured to limit a voltage across one or more switches of the AC switching controller, and the AC switching controller is configured to limit a current across an inductor of the DC-DC converter.

17. The wireless power receiver of claim 15, further comprising a means for controlling a clamping angle of the AC switching controller to have a minimum value above zero.

18. The wireless power receiver of claim 15, wherein:
the DC-DC converter comprises one or more first switches;
the AC switching controller comprises one or more second switches; and
the wireless power receiver further comprises a means for controlling a first duty cycle of the one or more first switches and a second duty cycle of the one or more second switches.

19. The wireless power receiver of claim 11, wherein the DC-DC converter is configured to limit a voltage across the one or more second switches of the AC switching controller, and the AC switching controller is configured to limit a current across an inductor of the DC-DC converter.

20. The wireless power receiver of claim 13, wherein the DC-DC converter is configured to limit a voltage across the one or more second switches of the AC switching controller, and the AC switching controller is configured to limit a current across an inductor of the DC-DC converter.

* * * * *